(12) United States Patent
Wang et al.

(10) Patent No.: US 12,360,346 B2
(45) Date of Patent: Jul. 15, 2025

(54) OPTICAL LENS ASSEMBLY AND PHOTOGRAPHING MODULE

(71) Applicant: NEWMAX TECHNOLOGY CO., LTD., Taichung (TW)

(72) Inventors: Chi-Chung Wang, Taichung (TW); Ya-Hsin Huang, Taichung (TW)

(73) Assignee: NEWMAX TECHNOLOGY CO., LTD., Taichung (TW)

( * ) Notice: Subject to any disclaimer, the term of this patent is extended or adjusted under 35 U.S.C. 154(b) by 739 days.

(21) Appl. No.: 17/679,068

(22) Filed: Feb. 23, 2022

(65) Prior Publication Data

US 2023/0176330 A1    Jun. 8, 2023

(30) Foreign Application Priority Data

Dec. 8, 2021    (TW) .................................. 110145836

(51) Int. Cl.
*G02B 13/00* (2006.01)
*G02B 9/64* (2006.01)
*G03B 17/12* (2021.01)

(52) U.S. Cl.
CPC ........... *G02B 13/0045* (2013.01); *G02B 9/64* (2013.01); *G03B 17/12* (2013.01)

(58) Field of Classification Search
CPC ....... G02B 13/0045; G02B 9/64; G03B 17/12
USPC .......................................................... 359/745
See application file for complete search history.

(56) References Cited

U.S. PATENT DOCUMENTS

| | | | | |
|---|---|---|---|---|
| 2020/0409124 | A1* | 12/2020 | Baik ......................... | G02B 9/64 |
| 2021/0080702 | A1* | 3/2021 | Sekine ...................... | G02B 9/64 |
| 2021/0149156 | A1* | 5/2021 | Huh .................... | G02B 27/0037 |
| 2021/0389559 | A1* | 12/2021 | Yoo ........................... | G02B 9/64 |
| 2022/0413264 | A1* | 12/2022 | Kim ......................... | G02B 9/64 |

* cited by examiner

*Primary Examiner* — Sharrief I Broome
(74) *Attorney, Agent, or Firm* — Juan Carlos A. Marquez; Marquez IP Law Office, PLLC

(57) ABSTRACT

An optical lens assembly includes a stop and, in order from an object side to an image side: a first lens, a second lens, a third lens, a fourth lens, a fifth lens, a sixth lens, and a seventh lens. The optical lens assembly has a half of a maximum field of view of the optical lens assembly a distance from an image-side surface of the seventh lens to an image plane on an optical axis, a radius of curvature of an object-side surface of the fourth lens, and a radius of curvature of an image-side surface of the fourth lens. An appropriate configuration of a high-quality lens module with the maximum field of view and an optical back focal length can be provided, to avoid interference of the structural appearance.

20 Claims, 17 Drawing Sheets

OPTICAL LENS ASSEMBLY AND PHOTOGRAPHING MODULE

CROSS-REFERENCE TO RELATED APPLICATION

This application claims the benefit of Taiwan Patent Application No. 110145836, filed on Dec. 8, 2021, which is hereby incorporated by reference for all purposes as if fully set forth herein.

BACKGROUND

Technical Field

The present disclosure relates to an optical lens assembly and a photographing module, and in particular, to an optical lens assembly and a photographing module for applying to an electronic device.

Related Art

With the rapid development of the portable electronic device, in order to facilitate portability, a small-sized optical lens module (i.e., photographing module) is indispensable. Due to the improvement in semiconductor process technologies, smaller image sensors having a higher image resolution are developed, so that the small-sized optical lens module enters the field of high image resolution. Therefore, the image quality becomes an important research direction.

The conventional seven-piece and small-sized optical lens module mounted on a portable electronic device, such as a mobile phone, a tablet computer, and other wearable electronic devices, is likely to have the sensitivity problem during manufacturing and assembly with large optical stop, resulting in difficulty in mass production and increased costs. In addition, in order to reduce assembly tolerances, the quality of the periphery of an image plane is sacrificed, and the periphery of the image plane is blurred or even deformed.

SUMMARY

An objective of the present disclosure is to resolve the above problems of the sensitivity and image quality of the small-sized optical lens module with large optical stop in the prior art. In order to achieve the above objective, the present disclosure provides an optical lens assembly, comprising a stop and, in order from an object side to an image side, comprising: a first lens with positive refractive power, comprising an object-side surface and an image-side surface; a second lens with negative refractive power, comprising an object-side surface and an image-side surface, one of the object-side surface and the image-side surface of the second lens being aspheric; a third lens with negative refractive power, comprising an object-side surface and an image-side surface, one of the object-side surface and the image-side surface of the third lens being aspheric; a fourth lens with positive refractive power, comprising an object-side surface and an image-side surface, one of the object-side surface and the image-side surface of the fourth lens being aspheric; a fifth lens with positive refractive power, comprising an object-side surface and an image-side surface, one of the object-side surface and the image-side surface of the fifth lens being aspheric; a sixth lens with positive refractive power, comprising an object-side surface and an image-side surface, one of the object-side surface and the image-side surface of the sixth lens being aspheric; and a seventh lens with negative refractive power, comprising an object-side surface and an image-side surface, one of the object-side surface and the image-side surface of the seventh lens being aspheric.

A half of a maximum field of view of the optical lens assembly is HFOV, a distance from the image-side surface of the seventh lens to an image plane on an optical axis is BFL, a radius of curvature of the object-side surface of the fourth lens is R7, a radius of curvature of the image-side surface of the fourth lens is R8, and the following conditions are satisfied: $45<\text{HFOV}*\text{BFL}$, and $-1032.81<\text{R7}*\text{R8}<-298.89$.

When the optical lens assembly satisfies the conditions of $45<\text{HFOV}*\text{BFL}$ and $-1032.8<\text{R7}*\text{R8}<-298.89$, an appropriate configuration of a high-quality lens module with the maximum field of view and an optical back focal length can be provided, to avoid interference of the structural appearance. The product quality of lens module can be enhanced by adjusting a surface contour of the fourth lens, reducing the sensitivity of the lens, and reducing the assembly tolerance. Preferably, the optical lens assembly can also satisfies the condition of $-946.74<\text{R7}*\text{R8}<-336.25$.

An object-side surface of the first lens is convex near the optical axis, and an image-side surface of the first lens is concave near the optical axis.

The object-side surface of the second lens is convex near the optical axis, and the image-side surface of the second lens is concave near the optical axis.

The object-side surface of the third lens is convex near the optical axis, and the image-side surface of the third lens is concave near the optical axis.

The object-side surface of the fourth lens is convex near the optical axis, and the image-side surface of the fourth lens is convex near the optical axis.

The object-side surface of the fifth lens is convex near the optical axis, and the image-side surface of the fifth lens is concave near the optical axis.

The object-side surface of the sixth lens is convex near the optical axis, and the image-side surface of the sixth lens is convex near the optical axis.

The object-side surface of the seventh lens is concave near the optical axis, and the image-side surface of the seventh lens is concave near the optical axis.

A total quantity of lenses with refractive power in the optical lens assembly is seven.

The stop is located on an object side of the first lens, or located between the first lens and the second lens.

The radius of curvature of the object-side surface of the fourth lens is R7, the radius of curvature of the image-side surface of the fourth lens is R8, and the following conditions are satisfied: $-946.74<\text{R7}*\text{R8}<-336.25$. In this way, the surface contour of the fourth lens is appropriately adjusted, so as to reduce the lens sensitivity and the assembly tolerance and enhance the product quality of lens module.

A distance from the image-side surface of the fourth lens to the object-side surface of the fifth lens along the optical axis is T45, a distance between the image-side surface of the sixth lens and the object-side surface of the seventh lens along the optical axis is T67, and the following condition is satisfied: $0.41<\text{T45}/\text{T67}<1.4$. In this way, an aberration of the optical lens assembly is reduced by effectively adjusting the distribution of the distance between the lenses.

A distance from the image-side surface of the sixth lens to the object-side surface of the seventh lens along the optical axis is T67, a radius of curvature of the object-side surface of the sixth lens is R11, a central thickness of the sixth lens along the optical axis is CT6, and the following condition is satisfied: $5.03<T67*R11/CT6<13.55$. In this way, a relationship between the thickness and the curvature of the sixth lens is balanced to reduce the lens sensitivity and enhance the manufacturing quality.

A shortest distance from the image-side surface of the seventh lens to the image plane is BFLM, a distance from the stop to the image plane along the optical axis is SL, and the following condition is satisfied: $0<BFLM/SL<0.18$. In this way, a balance between miniaturization and the back focal length is achieved.

A radius of curvature of the image-side surface of the first lens is R2, a distance from the image-side surface of the first lens to the object-side surface of the second lens along the optical axis is T12, and the following condition is satisfied: $169.89<R2/T12<517.65$. In this way, the appropriate adjustment to the distance between the first lens and the second lens facilitates the reduction in ghosting.

A focal length of the optical lens assembly is f, a radius of curvature of the image-side surface of the third lens is R6, a radius of curvature of the image-side surface of the fifth lens is R10, and the following condition is satisfied: $0.24<f/(R6+R10)<0.53$. In this way, a field curvature of the optical lens assembly can be effectively corrected, and the image quality around the picture is improved.

A radius of curvature of the object-side surface of the sixth lens is R11, a radius of curvature of the image-side surface of the fifth lens is R10, and the following condition is satisfied: $0.76<R11/R10<2.63$. In this way, the distortion of the optical lens assembly can be reduced, thereby enhancing the image quality.

The radius of curvature of the image-side surface of the fourth lens is R8, a radius of curvature of the image-side surface of the sixth lens is R12, and the following condition is satisfied: $0.23<R8/R12<7.11$. In this way, the astigmatism of the optical lens assembly is effectively reduced, thereby enhancing the image quality.

A distance from the image-side surface of the first lens to the object-side surface of the second lens along the optical axis is T12, a distance from the image-side surface of the second lens to the object-side surface of the third lens along the optical axis is T23, and the following condition is satisfied: $0.05<T12/T23<0.16$. In this way, the distance between the lenses can be appropriately distributed, so as to increase a field of view.

A central thickness of the seventh lens along the optical axis is CT7, a radius of curvature of the image-side surface of the seventh lens is R14, a radius of curvature of the image-side surface of the fifth lens is R10, and the following condition is satisfied: $0.21<CT7*R14/R10<0.55$. In this way, the back focal length can be increased by adjusting the thickness and the curvature of the seventh lens.

A focal length of the fourth lens is f4, a focal length of the sixth lens is f6, and the following condition is satisfied: $0.15<f6/f4<0.95$. In this way, the configuration of the refractive power is adjusted to achieve miniaturization.

A radius of curvature of the object-side surface of the third lens is R5, a radius of curvature of the image-side surface of the third lens is R6, a radius of curvature of the object-side surface of the fifth lens is R9, a radius of curvature of the image-side surface of the fifth lens is R10, and the following condition is satisfied: $2.75<R5*R6/R9*R10<60.45$. In this way, the curvature between the lenses is balanced to effectively reduce the lens sensitivity and increase the manufacturing yield.

The radius of curvature of the object-side surface of the fourth lens is R7, the radius of curvature of the image-side surface of the fourth lens is R8, a radius of curvature of the object-side surface of the fifth lens is R9, a radius of curvature of the image-side surface of the fifth lens is R10, and the following condition is satisfied: $-66.07<R7*R8/R9*R10<-7.08$. In this way, by adjusting the curvature distribution of the fourth lens and the fifth lens, a chromatic aberration of the optical lens assembly is improved to achieve the high image quality.

In addition, the present disclosure further provides a photographing module. The photographing module comprises: a lens barrel; an optical lens assembly disposed in the lens barrel; and an image sensor disposed on an image plane of the optical lens assembly.

The optical lens assembly comprises a stop and, in order from an object side to an image side, comprising: a first lens with positive refractive power, comprising an object-side surface and an image-side surface; a second lens with negative refractive power, comprising an object-side surface and an image-side surface, one of the object-side surface and the image-side surface of the second lens being aspheric; a third lens with negative refractive power, comprising an object-side surface and an image-side surface, one of the object-side surface and the image-side surface of the third lens being aspheric; a fourth lens with positive refractive power, comprising an object-side surface and an image-side surface, one of the object-side surface and the image-side surface of the fourth lens being aspheric; a fifth lens with positive refractive power, comprising an object-side surface and an image-side surface, one of the object-side surface and the image-side surface of the fifth lens being aspheric; a sixth lens with positive refractive power, comprising an object-side surface and an image-side surface, one of the object-side surface and the image-side surface of the sixth lens being aspheric; and a seventh lens with negative refractive power, comprising an object-side surface and an image-side surface, one of the object-side surface and the image-side surface of the seventh lens being aspheric.

A half of a maximum field of view of the optical lens assembly is HFOV, a distance from the image-side surface of the seventh lens to an image plane on an optical axis is BFL, a radius of curvature of the object-side surface of the fourth lens is R7, a radius of curvature of the image-side surface of the fourth lens is R8, and the following conditions are satisfied: $45<HFOV*BFL$, and $-1032.81<R7*R8<-298.89$.

When the optical lens assembly satisfies the conditions of $45<HFOV*BFL$ and $-1032.8<R7*R8<-298.89$, an appropriate configuration of a high-quality lens module with the maximum field of view and an optical back focal length can be provided, to avoid interference of the structural appearance. The product quality of lens module can be enhanced by adjusting a surface contour of the fourth lens, reducing the sensitivity of the lens, and reducing the assembly tolerance. Preferably, the optical lens assembly can also satisfies the condition of $-946.74<R7*R8<-336.25$.

An object-side surface of the first lens is convex near the optical axis, and an image-side surface of the first lens is concave near the optical axis.

The object-side surface of the second lens is convex near the optical axis, and the image-side surface of the second lens is concave near the optical axis.

The object-side surface of the third lens is convex near the optical axis, and the image-side surface of the third lens is concave near the optical axis.

The object-side surface of the fourth lens is convex near the optical axis, and the image-side surface of the fourth lens is convex near the optical axis.

The object-side surface of the fifth lens is convex near the optical axis, and the image-side surface of the fifth lens is concave near the optical axis.

The object-side surface of the sixth lens is convex near the optical axis, and the image-side surface of the sixth lens is convex near the optical axis.

The object-side surface of the seventh lens is concave near the optical axis, and the image-side surface of the seventh lens is concave near the optical axis.

A total quantity of lenses with refractive power in the optical lens assembly is seven.

The stop is located on an object side of the first lens, or located between the first lens and the second lens.

The radius of curvature of the object-side surface of the fourth lens is R7, the radius of curvature of the image-side surface of the fourth lens is R8, and the following conditions are satisfied: $-946.74<R7*R8<-336.25$. In this way, the surface contour of the fourth lens is appropriately adjusted, so as to reduce the lens sensitivity and the assembly tolerance and enhance the product quality of lens module.

A distance from the image-side surface of the fourth lens to the object-side surface of the fifth lens along the optical axis is T45, a distance from the image-side surface of the sixth lens to the object-side surface of the seventh lens along the optical axis is T67, and the following condition is satisfied: $0.41<T45/T67<1.4$. In this way, an aberration of the optical lens assembly is reduced by effectively adjusting the distribution of the distance between the lenses.

A distance from the image-side surface of the sixth lens to the object-side surface of the seventh lens along the optical axis is T67, a radius of curvature of the object-side surface of the sixth lens is R11, a central thickness of the sixth lens along the optical axis is CT6, and the following condition is satisfied: $5.03<T67*R11/CT6<13.55$. In this way, a relationship between the thickness and the curvature of the sixth lens is balanced to reduce the lens sensitivity and enhance the manufacturing quality.

A shortest distance from the image-side surface of the seventh lens to the image plane is BFLM, a distance from the stop to the image plane along the optical axis is SL, and the following condition is satisfied: $0<BFLM/SL<0.18$. In this way, a balance between miniaturization and the back focal length is achieved.

A radius of curvature of the image-side surface of the first lens is R2, a distance from the image-side surface of the first lens to the object-side surface of the second lens along the optical axis is T12, and the following condition is satisfied: $169.89<R2/T12<517.65$. In this way, the appropriate adjustment to the distance between the first lens and the second lens facilitates the reduction in ghosting.

A focal length of the optical lens assembly is f, a radius of curvature of the image-side surface of the third lens is R6, a radius of curvature of the image-side surface of the fifth lens is R10, and the following condition is satisfied: $0.24<f/(R6+R10)<0.53$. In this way, a field curvature of the optical lens assembly can be effectively corrected, and the image quality around the picture is improved.

A radius of curvature of the object-side surface of the sixth lens is R11, a radius of curvature of the image-side surface of the fifth lens is R10, and the following condition is satisfied: $0.76<R11/R10<2.63$. In this way, the distortion of the optical lens assembly can be reduced, thereby enhancing the image quality.

The radius of curvature of the image-side surface of the fourth lens is R8, a radius of curvature of the image-side surface of the sixth lens is R12, and the following condition is satisfied: $0.23<R8/R12<7.11$. In this way, the astigmatism of the optical lens assembly is effectively reduced, thereby enhancing the image quality.

A distance from the image-side surface of the first lens to the object-side surface of the second lens along the optical axis is T12, a distance from the image-side surface of the second lens to the object-side surface of the third lens along the optical axis is T23, and the following condition is satisfied: $0.05<T12/T23<0.16$. In this way, the distance between the lenses can be appropriately distributed, so as to increase a field of view.

A central thickness of the seventh lens along the optical axis is CT7, a radius of curvature of the image-side surface of the seventh lens is R14, a radius of curvature of the image-side surface of the fifth lens is R10, and the following condition is satisfied: $0.21<CT7*R14/R10<0.55$. In this way, the back focal length can be increased by adjusting the thickness and the curvature of the seventh lens.

A focal length of the fourth lens is f4, a focal length of the sixth lens is f6, and the following condition is satisfied: $0.15<f6/f4<0.95$. In this way, the configuration of the refractive power is adjusted to achieve miniaturization.

A radius of curvature of the object-side surface of the third lens is R5, a radius of curvature of the image-side surface of the third lens is R6, a radius of curvature of the object-side surface of the fifth lens is R9, a radius of curvature of the image-side surface of the fifth lens is R10, and the following condition is satisfied: $2.75<R5*R6/R9*R10<60.45$. In this way, the curvature between the lenses is balanced to effectively reduce the lens sensitivity and increase the manufacturing yield.

The radius of curvature of the object-side surface of the fourth lens is R7, the radius of curvature of the image-side surface of the fourth lens is R8, a radius of curvature of the object-side surface of the fifth lens is R9, a radius of curvature of the image-side surface of the fifth lens is R10, and the following condition is satisfied: $-66.07<R7*R8/R9*R10<-7.08$. In this way, by adjusting the curvature distribution of the fourth lens and the fifth lens, a chromatic aberration of the optical lens assembly is improved to achieve the high image quality.

According to the optical lens assembly and the photographing module in the present disclosure, a high quality lens module with a high resolution and a large viewing angle can be provided. Another effect of the present disclosure is to increase a back focal length, so as to provide a more sufficient structural appearance space, thereby improving the quality of products.

DETAILED DESCRIPTION

In order to enable a person of ordinary skill in the art to understand and realize the contents of the present disclosure, the following are illustrated by proper embodiments with accompanying drawings, and the equivalent substitutions and modifications based on the contents of the present disclosure are included in the scope of the present disclosure. It is also stated that the accompanying drawings of the present disclosure are not depictions of actual dimensions, and although the present disclosure provides embodiments of particular parameters, it is to be understood that the parameters need not be exactly equal to their corresponding values, and that, within an acceptable margin of error, are approximate to their corresponding parameters. The following embodiments will further detail the technical aspects of the present disclosure, but the disclosure is not intended to limit the scope of the present disclosure.

First Embodiment

Figure 1A:
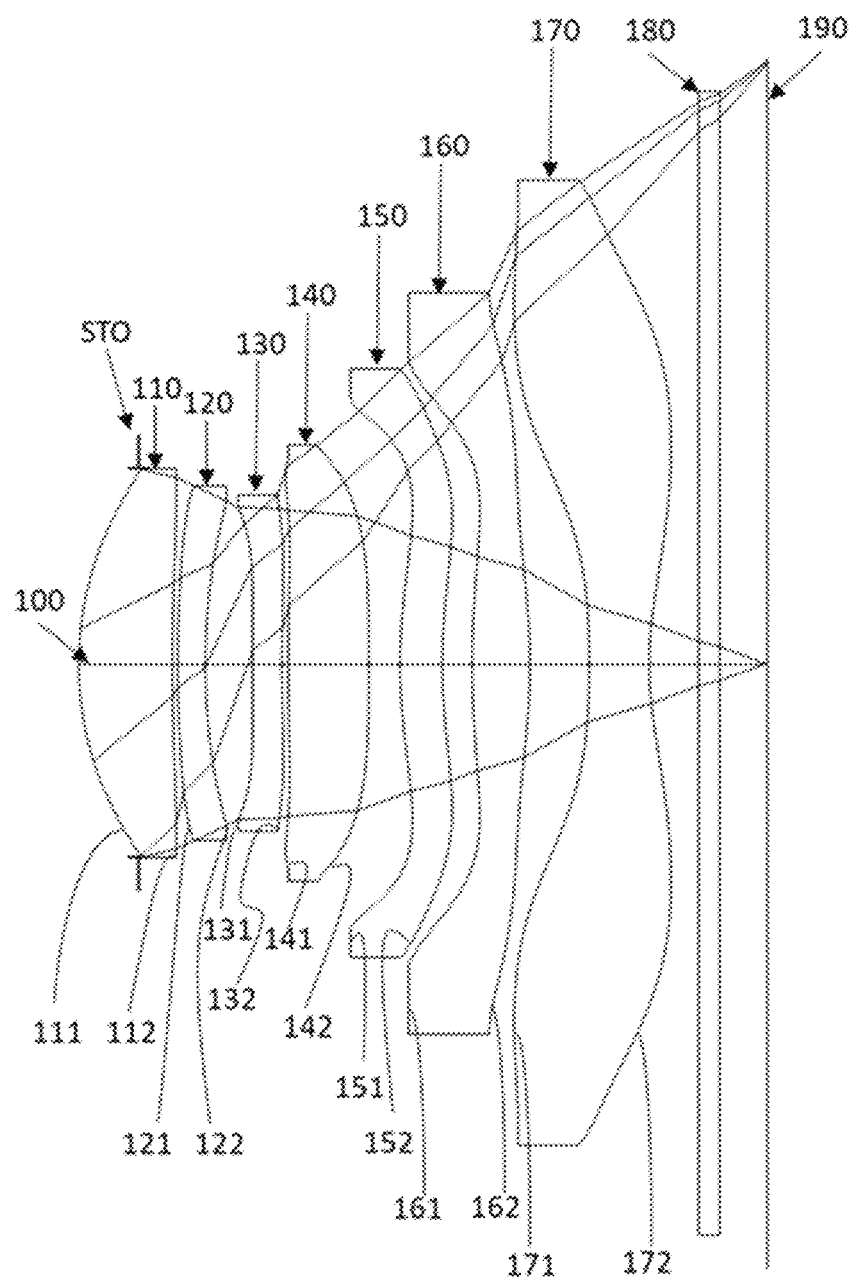
FIG. 1A is a schematic view of an optical lens assembly according to a first embodiment of the present disclosure.
Figure 1B:
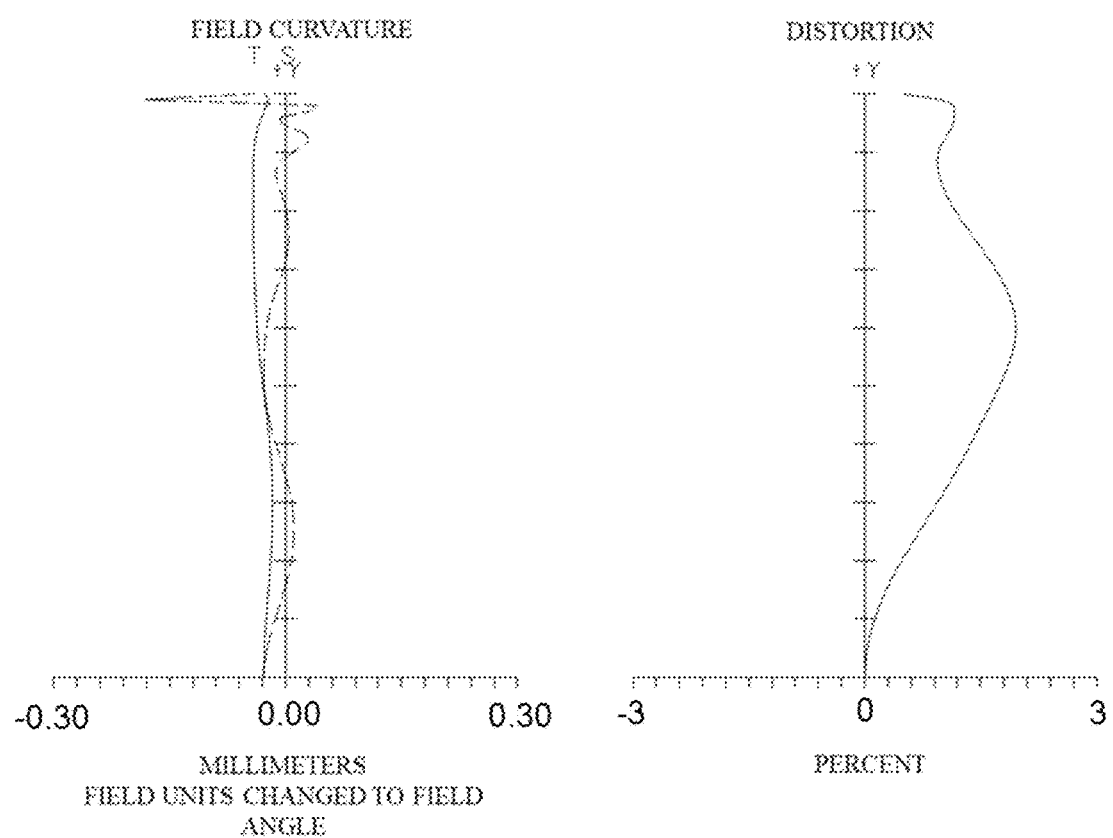
FIG. 1B sequentially shows a field curvature curve and a distortion curve of an optical lens assembly according to a first embodiment.

Refer to FIG. 1A and FIG. 1B. FIG. 1A is a schematic view of an optical lens assembly according to a first embodiment of the present disclosure, and FIG. 1B shows a field curvature curve and a distortion curve of an optical lens assembly according to a first embodiment. As can be seen from FIG. 1A, the optical lens assembly includes a stop STO and includes, in order from an object side to an image side: a first lens 110, a second lens 120, a third lens 130, a fourth lens 140, a fifth lens 150, a sixth lens 160, a seventh lens 170, an IR-cut filter 180, and an image plane 190. A total quantity of lenses with refractive power in the optical lens assembly is seven, but not limited thereto.

The first lens 110 with positive refractive power is made of a plastic material and includes an object-side surface 111 and an image-side surface 112, wherein the object-side surface 111 of the first lens 110 is convex near an optical axis 100, and the image-side surface 112 of the first lens 110 is concave near the optical axis 100. The object-side surface 111 and the image-side surface 112 are aspheric.

The second lens 120 with negative refractive power is made of a plastic material and includes an object-side surface 121 and an image-side surface 122, wherein the object-side surface 121 of the second lens 120 is convex near the optical axis 100, and the image-side surface 122 of the second lens 120 is concave near the optical axis 100. The object-side surface 121 and the image-side surface 122 are aspheric.

The third lens 130 with negative refractive power is made of a plastic material and includes an object-side surface 131 and an image-side surface 132, wherein the object-side surface 131 of the third lens 130 is convex near an optical axis 100, and the image-side surface 132 of the third lens 130 is concave near the optical axis 100. The object-side surface 131 and the image-side surface 132 are aspheric.

The fourth lens 140 with positive refractive power is made of a plastic material and includes an object-side surface 141 and an image-side surface 142, wherein the object-side surface 141 of the fourth lens 140 is convex near an optical axis 100, and the image-side surface 142 of the fourth lens 140 is convex near the optical axis 100. The object-side surface 141 and the image-side surface 142 are aspheric.

The fifth lens 150 with positive refractive power is made of a plastic material and includes an object-side surface 151 and an image-side surface 152, wherein the object-side surface 151 of the fifth lens 150 is convex near the optical axis 100, and the image-side surface 152 of the fifth lens 150 is concave near the optical axis 100. The object-side surface 151 and the image-side surface 152 are aspheric.

The sixth lens 160 with positive refractive power is made of a plastic material and includes an object-side surface 161 and an image-side surface 162, wherein the object-side surface 161 of the sixth lens 160 is convex near the optical axis 100, and the image-side surface 162 of the sixth lens 160 is convex near the optical axis 100. The object-side surface 161 and the image-side surface 162 are aspheric.

The seventh lens 170 with negative refractive power is made of a plastic material and includes an object-side surface 171 and an image-side surface 172, wherein the object-side surface 171 of the seventh lens 170 is concave near an optical axis 100, and the image-side surface 172 of the seventh lens 170 is concave near the optical axis 100. The object-side surface 171 and the image-side surface 172 are aspheric.

The IR-cut filter 180 is made of glass, and is disposed between the seventh lens 170 and the image plane 190 without affecting a focal length of the optical lens assembly. It can be understood that, the IR-cut filter 180 may also be formed on the surface of the above-mentioned lens. The IR-cut filter 180 may also be made of other materials.

An aspheric curve equation of the above-mentioned lenses is expressed as follows:

$$z(h) = \frac{ch^2}{1 + \left[1 - (k+1)c^2h^2\right]^{0.5}} + \sum (A_i) \cdot (h^i)$$

wherein, z is a position value in the direction of the optical axis 100 and with a surface vertex as a reference at a position of a height h; c is a curvature of a lens surface near the optical axis 100, and is a reciprocal of a radius of curvature (R) (c=1/R), R is a radius of curvature of a lens surface near the optical axis 100, h is a vertical distance between the lens surface and the optical axis 100, k is a conic constant, and $A_i$ is an $i^{th}$ order aspheric coefficient.

In the first embodiment, a focal length of the optical lens assembly is f, an f-number of the optical lens assembly is Fno, and a maximum field of view (field of view 2ω)) in the optical lens assembly is FOV, and values are as follows: f=5.51 (millimeters), Fno=1.62, and FOV=86.8 (degrees).

In the optical lens assembly of the first embodiment, a half of the maximum field of view of the optical lens assembly is HFOV, a distance from the image-side surface of the seventh lens 170 to the image plane along the optical axis 100 is BFL, a radius of curvature of the object-side surface 141 of the fourth lens 140 is R7, a radius of curvature of the image-side surface 142 of the fourth lens 140 is R8, and the following conditions are satisfied: HFOV*BFL=52.03, and R7*R8=−837.59.

In the optical lens assembly of the first embodiment, a distance from the image-side surface 142 of the fourth lens 140 to the object-side surface 151 of the fifth lens 150 along the optical axis 100 is T45, a distance from the image-side surface 162 of the sixth lens 160 to the object-side surface 171 of the seventh lens 170 along the optical axis 100 is T67, and the following condition is satisfied: T45/T67=0.51.

In the optical lens assembly of the first embodiment, a distance from the image-side surface 162 of the sixth lens 160 to the object-side surface 171 of the seventh lens 170 along the optical axis 100 is T67, a radius of curvature of the object-side surface 161 of the sixth lens 160 is R11, a central thickness of the sixth lens 160 along the optical axis 100 is CT6, and the following condition is satisfied: T67*R11/CT6=6.66.

In the optical lens assembly of the first embodiment, a shortest distance from the image-side surface 172 of the seventh lens 170 to the image plane 190 is BFLM, a distance from the stop STO to the image plane 190 along the optical axis 100 is SL, and the following condition is satisfied: BFLM/SL=0.15.

In the optical lens assembly of the first embodiment, a radius of curvature of the image-side surface 112 of the first lens 110 is R2, a distance from the image-side surface 112 of the first lens 110 to the object-side surface 121 of the second lens 120 along the optical axis 100 is T12, and the following condition is satisfied: R2/T12=310.34.

In the optical lens assembly of the first embodiment, a focal length of the optical lens assembly is f, a radius of curvature of the image-side surface 132 of the third lens 130 is R6, a radius of curvature of the image-side surface 152 of the fifth lens 150 is R10, and the following condition is satisfied: f/(R6+R10)=0.29.

In the optical lens assembly of the first embodiment, a radius of curvature of the object-side surface 161 of the sixth lens 160 is R11, a radius of curvature of the image-side surface 152 of the fifth lens 150 is R10, and the following condition is satisfied: R11/R10=1.61.

In the optical lens assembly of the first embodiment, a radius of curvature of the image-side surface 142 of the fourth lens 140 is R8, a radius of curvature of the image-side surface 162 of the sixth lens 160 is R12, and the following condition is satisfied: R8/R12=5.92.

In the optical lens assembly of the first embodiment, a distance from the image-side surface 112 of the first lens 110 to the object-side surface 121 of the second lens 120 along the optical axis 100 is T12, a distance from the image-side surface 122 of the second lens 120 to the object-side surface 131 of the third lens 130 along the optical axis 100 is T23, and the following condition is satisfied: T12/T23=0.09.

In the optical lens assembly of the first embodiment, a central thickness of the seventh lens 170 along the optical axis 100 is CT7, a radius of curvature of the image-side surface 172 of the seventh lens 170 is R14, a radius of curvature of the image-side surface 152 of the fifth lens 150 is R10, and the following condition is satisfied: CT7*R14/R10=0.38.

In the optical lens assembly of the first embodiment, a focal length of the fourth lens 140 is f4, a focal length of the sixth lens 160 is f6, and the following condition is satisfied: f6/f4=0.18.

In the optical lens assembly of the first embodiment, a radius of curvature of the object-side surface 131 of the third lens 130 is R5, a radius of curvature of the image-side surface 132 of the third lens 130 is R6, a radius of curvature of the object-side surface 151 of the fifth lens 150 is R9, a radius of curvature of the image-side surface 152 of the fifth lens 150 is R10, and the following condition is satisfied: R5*R6/R9*R10=50.37.

In the optical lens assembly of the first embodiment, a radius of curvature of the object-side surface 141 of the fourth lens 140 is R7, a radius of curvature of the image-side surface 142 of the fourth lens 140 is R8, a radius of curvature of the object-side surface 151 of the fifth lens 150 is R9, a radius of curvature of the image-side surface 152 of the fifth lens 150 is R10, and the following condition is satisfied: R7*R8/R9*R10=−55.06.

Refer to Table 1 and Table 2 below.

TABLE 1

First embodiment
f (focal length) = 5.51 mm (millimeters), Fno (f-number) = 1.62, FOV (field of view 2ω) = 86.8 deg (degrees).

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | Stop | Infinity | | −0.615 | | | | |
| 2 | First lens | 2.508 | (ASP) | 0.953 | Plastic | 1.54 | 55.99 | 5.48 |
| 3 | | 13.344 | (ASP) | 0.043 | | | | |
| 4 | Second lens | 8.992 | (ASP) | 0.28 | Plastic | 1.66 | 20.37 | −15.83 |
| 5 | | 4.796 | (ASP) | 0.489 | | | | |
| 6 | Third lens | 51.814 | (ASP) | 0.300 | Plastic | 1.67 | 19.24 | −30.65 |
| 7 | | 14.79 | (ASP) | 0.063 | | | | |
| 8 | Fourth lens | 32.351 | (ASP) | 0.819 | Plastic | 1.54 | 55.99 | 26.46 |
| 9 | | −25.891 | (ASP) | 0.312 | | | | |
| 10 | Fifth lens | 3.827 | (ASP) | 0.421 | Plastic | 1.57 | 37.67 | 87.6 |
| 11 | | 3.975 | (ASP) | 0.305 | | | | |
| 12 | Sixth lens | 6.417 | (ASP) | 0.585 | Plastic | 1.54 | 55.99 | 4.85 |
| 13 | | −4.371 | (ASP) | 0.607 | | | | |

TABLE 1-continued

First embodiment
f (focal length) = 5.51 mm (millimeters), Fno (f-number) = 1.62, FOV (field of view 2ω) = 86.8 deg (degrees).

| Surface # | | Radius of curvature (mm) | | Central thickness/gap (mm) | Material | Refractive index (nd) | Abbe number (vd) | Focal length (mm) |
|---|---|---|---|---|---|---|---|---|
| 14 | Seventh lens | −7.636 | (ASP) | 0.604 | Plastic | 1.54 | 55.99 | −3.41 |
| 15 | | 2.533 | (ASP) | 0.500 | | | | |
| 16 | IR-cut filter | Infinity | | 0.210 | Glass | 1.52 | 64.20 | |
| 17 | | Infinity | | 0.489 | | | | |
| 18 | Image Plane | Infinity | | — | | | | |

Reference wavelength 555 nm

TABLE 2

Aspheric coefficient

| Surface # | 2 | 3 | 4 | 5 | 6 | 7 | 8 |
|---|---|---|---|---|---|---|---|
| K: | −8.5990E+00 | 1.0330E+01 | 1.8193E+01 | −4.7185E+00 | −9.9000E+01 | −2.6519E+01 | 6.7942E+01 |
| A2: | 0.0000E+00 | 0.0000E+00 | 0.0000E+00 | 0.0000E+00 | 0.0000E+00 | 0.0000E+00 | 0.0000E+00 |
| A4: | 6.9094E−02 | −2.3264E−02 | −2.4879E−02 | 9.5133E−03 | −1.7543E−02 | 3.0714E−02 | 3.5126E−02 |
| A6: | −4.5907E−02 | 4.7900E−03 | 1.9584E−02 | −7.9521E−03 | −5.4078E−02 | −1.8772E−01 | −1.2325E−01 |
| A8: | 5.3030E−02 | 4.3274E−02 | 2.5197E−02 | 3.2035E−02 | 8.8413E−02 | 3.6664E−01 | 1.9772E−01 |
| A10: | −5.6472E−02 | −8.8780E−02 | −8.2780E−02 | −4.9706E−02 | −1.0339E−01 | −4.5629E−01 | −1.8634E−01 |
| A12: | 4.1991E−02 | 8.7747E−02 | 9.8376E−02 | 3.5050E−02 | 6.7620E−02 | 3.5994E−01 | 1.0037E−01 |
| A14: | −2.0032E−02 | −5.0407E−02 | −6.4055E−02 | −7.5514E−03 | −2.1910E−02 | −1.8352E−01 | −3.0540E−02 |
| A16: | 5.8109E−03 | 1.7008E−02 | 2.3933E−02 | −4.4957E−03 | 2.7599E−04 | 5.9190E−02 | 4.8858E−03 |
| A18: | −9.3397E−04 | −3.1224E−03 | −4.7935E−03 | 2.9393E−03 | 2.0750E−03 | −1.0893E−02 | −3.0724E−04 |
| A20: | 6.3665E−05 | 2.4039E−04 | 3.9872E−04 | −4.8484E−04 | −4.4315E−04 | 8.6268E−04 | −2.9511E−06 |

| Surface | 9 | 10 | 11 | 12 | 13 | 14 | 15 |
|---|---|---|---|---|---|---|---|
| K: | 8.7473E+01 | −8.1727E−01 | −4.0077E+00 | −1.4709E−01 | −3.0853E+01 | −3.0590E+01 | −9.3377E+00 |
| A2: | 0.0000E+00 | 0.0000E+00 | 0.0000E+00 | 0.0000E+00 | 0.0000E+00 | 0.0000E+00 | 0.0000E+00 |
| A4: | −2.1079E−02 | −4.0487E−02 | −5.3979E−02 | −2.0482E−02 | −2.4883E−03 | −6.2814E−02 | −3.0025E−02 |
| A6: | −2.9423E−02 | 2.1607E−02 | 3.9427E−02 | 3.0760E−03 | 1.1278E−02 | 1.5366E−02 | 6.8462E−03 |
| A8: | 5.2822E−02 | −2.4252E−02 | −3.3421E−02 | 2.7584E−03 | −4.0550E−03 | −1.6905E−03 | −9.9597E−04 |
| A10: | −6.0941E−02 | 1.5363E−02 | 1.6024E−02 | −5.3956E−03 | 3.4917E−04 | 1.9504E−04 | 6.8544E−05 |
| A12: | 4.5498E−02 | −6.3787E−03 | −4.8294E−03 | 2.6342E−03 | 7.9951E−05 | −3.5875E−05 | 4.4040E−07 |
| A14: | −2.1500E−02 | 1.7232E−03 | 9.5076E−04 | −6.4607E−04 | −2.2721E−05 | 4.7373E−06 | −4.6620E−07 |
| A16: | 6.1443E−03 | −2.9338E−04 | −1.1754E−04 | 8.8233E−05 | 2.3309E−06 | −3.4490E−07 | 3.7000E−08 |
| A18: | −9.6796E−04 | 2.8338E−05 | 8.1952E−06 | −6.3722E−06 | −1.1230E−07 | 1.2900E−08 | −1.3000E−09 |
| A20: | 6.4535E−05 | −1.1594E−06 | −2.4440E−07 | 1.8920E−07 | 2.1000E−09 | −2.0000E−10 | 0.0000E+00 |

Table 1 shows detailed configuration data of the first embodiment in FIG. 1A. Units of the radius of curvature, the central thickness, the gap, and the focal length is mm. Surfaces 0 to 18 sequentially represent surfaces from an object side to an image side. Surface 0 is a gap between an object and the stop STO along the optical axis 100, and surface 1 is a gap between the stop STO and the object-side surface 111 of the first lens 110 along the optical axis 100. The object-side surface 111 of the first lens 110 is closer to the object side than the stop STO, and therefore the stop STO is represented by a negative value. Otherwise, if the stop STO is closer to the object side than the object-side surface 111 of the first lens 110, the stop STO is represented by a positive value. Surfaces 2, 4, 6, 8, 10, 12, 14, and 16 are respectively central thicknesses of the first lens 110, the second lens 120, the third lens 130, the fourth lens 140, the fifth lens 150, the sixth lens 160, the seventh lens 170, and the IR-cut filter 180 along the optical axis 100. Surfaces 3, 5, 7, 9, 11, 13, 15, and 17 respectively are a gap between the first lens 110 and the second lens 120 along the optical axis 100, a gap between the second lens 120 and the third lens 130 along the optical axis 100, a gap between the third lens 130 and the fourth lens 140 along the optical axis 100, a gap between the fourth lens 140 and the fifth lens 150 along the optical axis 100, a gap between the fifth lens 150 and the sixth lens 160 along the optical axis 100, a gap between the sixth lens 160 and the seventh lens 170 along the optical axis 100, a gap between the seventh lens 170 and the IR-cut filter 180 along the optical axis 100, and a gap between the IR-cut filter 180 and the image plane 190 along the optical axis 100.

Table 2 shows aspheric data in the first embodiment. k represents a conic constant in an aspheric curve equation, and A2, A4, A6, A8, A10, A12, A14, A16, A18, and A20 are high-order aspheric coefficients. In addition, the following tables of embodiments are schematic diagrams and aberration curves corresponding to the embodiments. The definitions of data in the tables of the embodiments are the same as the definitions in Table 1 and Table 2 of the first embodiment, and are not repeated herein.

Second Embodiment

Figure 2A:
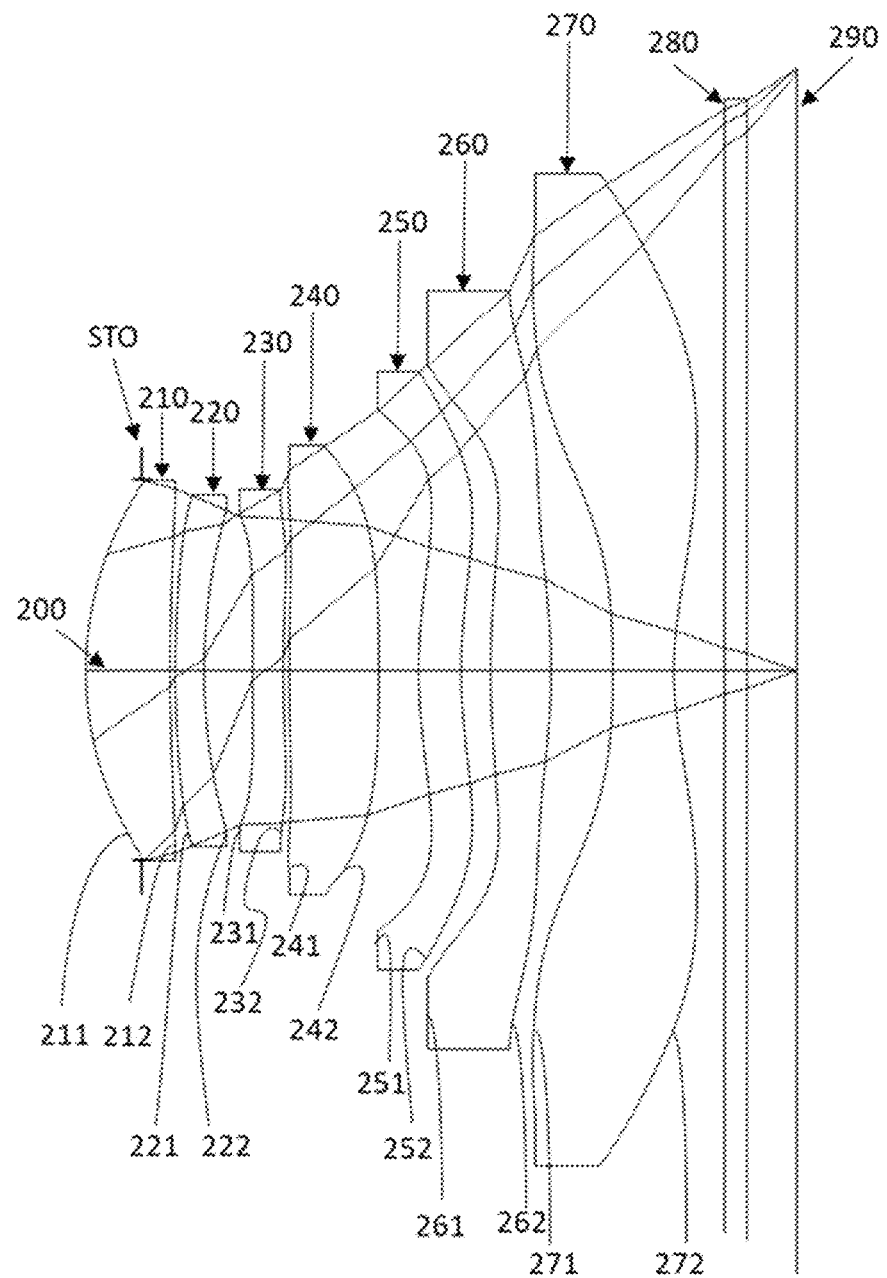
FIG. 2A is a schematic view of an optical lens assembly according to a second embodiment of the present disclosure.
Figure 2B:
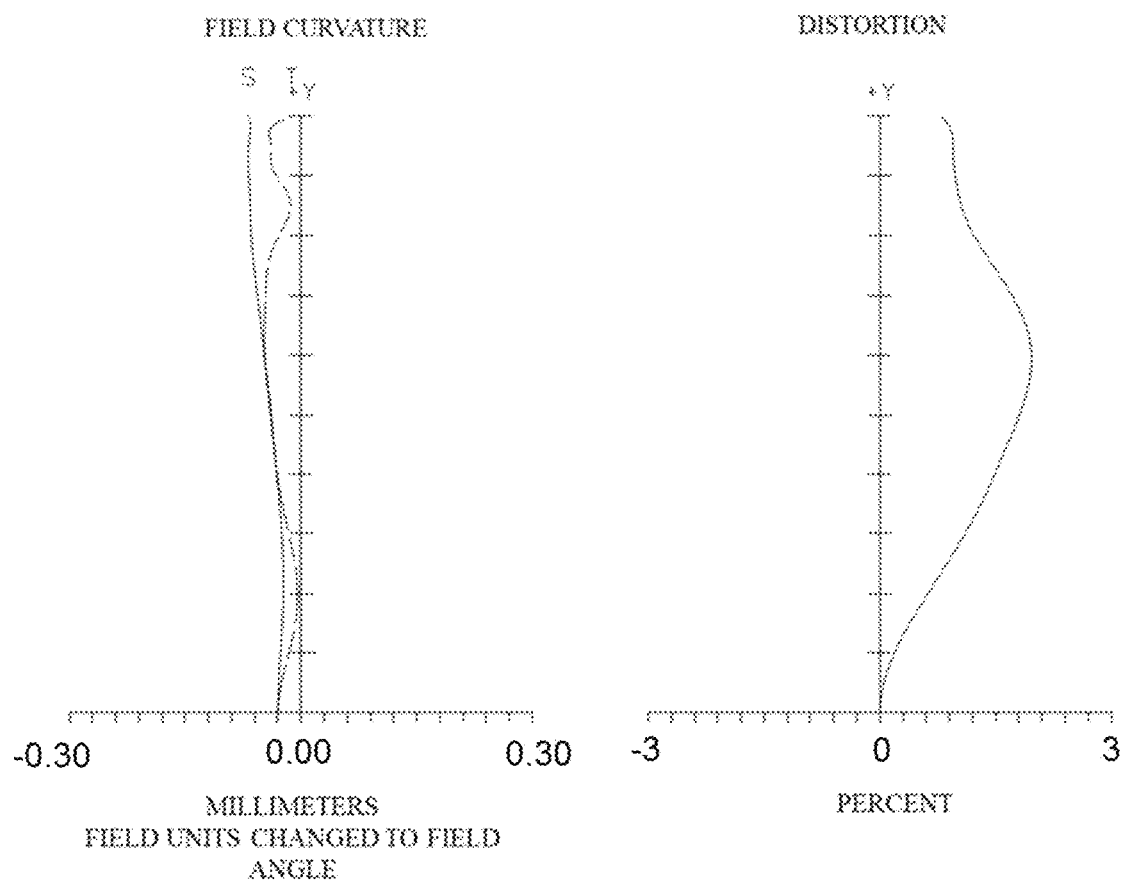
FIG. 2B sequentially shows a field curvature curve and a distortion curve of an optical lens assembly according to a second embodiment.

Refer to FIG. 2A and FIG. 2B. FIG. 2A is a schematic view of an optical lens assembly according to a second embodiment of the present disclosure, and FIG. 2B shows a field curvature curve and a distortion curve of an optical lens assembly according to a second embodiment. As can be seen from FIG. 2A, the optical lens assembly includes a stop STO and includes, in order from an object side to an image side: a first lens 210, a second lens 220, a third lens 230, a fourth lens 240, a fifth lens 250, a sixth lens 260, a seventh lens 270, an IR-cut filter 280, and an image plane 290. A total quantity of lenses with refractive power in the optical lens assembly is seven, but not limited thereto.

The first lens 210 with positive refractive power is made of a plastic material and includes an object-side surface 211 and an image-side surface 212, wherein the object-side surface 211 of the first lens 210 is convex near an optical axis 200, and the image-side surface 212 of the first lens 210 is concave near the optical axis 200. The object-side surface 211 and the image-side surface 212 are aspheric.

The second lens 220 with negative refractive power is made of a plastic material and includes an object-side surface 221 and an image-side surface 222, wherein the object-side surface 221 of the second lens 220 is convex near the optical axis 200, and the image-side surface 222 of the second lens 220 is concave near the optical axis 200. The object-side surface 221 and the image-side surface 222 are aspheric.

The third lens 230 with negative refractive power is made of a plastic material and includes an object-side surface 231 and an image-side surface 232, wherein the object-side surface 231 of the third lens 230 is convex near an optical axis 200, and the image-side surface 232 of the third lens 230 is concave near the optical axis 200. The object-side surface 231 and the image-side surface 232 are aspheric.

The fourth lens 240 with positive refractive power is made of a plastic material and includes an object-side surface 241 and an image-side surface 242, wherein the object-side surface 241 of the fourth lens 240 is convex near an optical axis 200, and the image-side surface 242 of the fourth lens 240 is convex near the optical axis 200. The object-side surface 241 and the image-side surface 242 are aspheric.

The fifth lens 250 with positive refractive power is made of a plastic material and includes an object-side surface 251 and an image-side surface 252, wherein the object-side surface 251 of the fifth lens 250 is convex near the optical axis 200, and the image-side surface 252 of the fifth lens 250 is concave near the optical axis 200. The object-side surface 251 and the image-side surface 252 are aspheric.

The sixth lens 260 with positive refractive power is made of a plastic material and includes an object-side surface 261 and an image-side surface 262, wherein the object-side surface 261 of the sixth lens 260 is convex near the optical axis 200, and the image-side surface 262 of the sixth lens 260 is convex near the optical axis 200. The object-side surface 261 and the image-side surface 262 are aspheric.

The seventh lens 270 with negative refractive power is made of a plastic material and includes an object-side surface 271 and an image-side surface 272, wherein the object-side surface 271 of the seventh lens 270 is concave near an optical axis 200, and the image-side surface 272 of the seventh lens 270 is concave near the optical axis 200. The object-side surface 271 and the image-side surface 272 are aspheric.

The IR-cut filter 280 is made of glass, and is disposed between the seventh lens 270 and the image plane 290 without affecting a focal length of the optical lens assembly. It can be understood that, the IR-cut filter 280 may also be formed on the surface of the above-mentioned lens. The IR-cut filter 280 may also be made of other materials.

Refer to Table 3 and Table 4 below.

TABLE 3

Second embodiment
f (focal length) = 5.50 mm (millimeters), Fno (f-number) = 1.70, FOV (field of view 2ω) = 85.0 deg (degree).

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Photographed object | Infinity | | Infinity | | | | |
| 1 | Stop | Infinity | | −0.562 | | | | |
| 2 | First lens | 2.503 | (ASP) | 0.827 | Plastic | 1.54 | 55.99 | 5.62 |
| 3 | | 11.962 | (ASP) | 0.054 | | | | |
| 4 | Second lens | 7.784 | (ASP) | 0.280 | Plastic | 1.66 | 20.37 | −16.95 |
| 5 | | 4.545 | (ASP) | 0.475 | | | | |
| 6 | Third lens | 32.392 | (ASP) | 0.300 | Plastic | 1.67 | 19.24 | −25.51 |
| 7 | | 11.228 | (ASP) | 0.069 | | | | |
| 8 | Fourth lens | 23.693 | (ASP) | 0.872 | Plastic | 1.54 | 55.99 | 19.43 |
| 9 | | −18.976 | (ASP) | 0.385 | | | | |
| 10 | Fifth lens | 3.647 | (ASP) | 0.419 | Plastic | 1.57 | 37.67 | 186.76 |
| 11 | | 3.616 | (ASP) | 0.294 | | | | |
| 12 | Sixth lens | 6.493 | (ASP) | 0.597 | Plastic | 1.54 | 55.99 | 4.84 |
| 13 | | −4.320 | (ASP) | 0.604 | | | | |
| 14 | Seventh lens | −7.658 | (ASP) | 0.599 | Plastic | 1.54 | 55.99 | −3.43 |
| 15 | | 2.549 | (ASP) | 0.500 | | | | |
| 16 | IR-cut filter | Infinity | | 0.210 | Glass | 1.52 | 64.20 | |
| 17 | | Infinity | | 0.496 | | | | |
| 18 | Image Plane | Infinity | | — | | | | |

Reference wavelength 555 nm

TABLE 4

Aspheric coefficient

| Surface # | 2 | 3 | 4 | 5 | 6 | 7 | 8 |
|---|---|---|---|---|---|---|---|
| K: | −8.9471E+00 | 7.6232E+00 | 1.5697E+01 | −5.0036E+00 | −9.9000E+01 | −1.7319E+01 | 7.0254E+01 |
| A2: | 0.0000E+00 | 0.0000E+00 | 0.0000E+00 | 0.0000E+00 | 0.0000E+00 | 0.0000E+00 | 0.0000E+00 |
| A4: | 7.6239E-02 | −1.6522E-02 | −2.6411E-02 | 1.1660E-02 | −2.5757E-02 | 3.6918E-03 | 1.2945E-02 |
| A6: | −6.5922E-02 | −1.1064E-02 | 4.1446E-02 | −1.7541E-02 | −2.0851E-02 | −9.8321E-02 | −7.1313E-02 |
| A8: | 9.5445E-02 | 7.0518E-02 | −6.1236E-02 | 5.8342E-02 | 2.2876E-03 | 1.9857E-01 | 1.3397E-01 |
| A10: | −1.1473E-01 | −1.2414E-01 | 7.6216E-02 | −1.0151E-01 | 3.9544E-02 | −2.5818E-01 | −1.4751E-01 |
| A12: | 9.2599E-02 | 1.2135E-01 | −6.8482E-02 | 1.0077E-01 | −8.8506E-02 | 2.0629E-01 | 9.1671E-02 |
| A14: | −4.7455E-02 | −7.1782E-02 | 4.1604E-02 | −5.9028E-02 | 8.9110E-02 | −1.0426E-01 | −3.2578E-02 |
| A16: | 1.4747E-02 | 2.5371E-02 | −1.6089E-02 | 1.9350E-02 | −4.8432E-02 | 3.3307E-02 | 6.4574E-03 |
| A18: | −2.5305E-03 | −4.9139E-03 | 3.5881E-03 | −2.9992E-03 | 1.3958E-02 | −6.1256E-03 | −6.3091E-04 |
| A20: | 1.8346E-04 | 3.9951E-04 | −3.5091E-04 | 1.2299E-04 | −1.6740E-03 | 4.8938E-04 | 2.0352E-05 |

| Surface # | 9 | 10 | 11 | 12 | 13 | 14 | 15 |
|---|---|---|---|---|---|---|---|
| K: | 6.5521E+01 | −1.0646E+00 | −3.7156E+00 | 6.4537E-02 | −3.0414E+01 | −4.7097E+01 | −7.6927E+00 |
| A2: | 0.0000E+00 | 0.0000E+00 | 0.0000E+00 | 0.0000E+00 | 0.0000E+00 | 0.0000E+00 | 0.0000E+00 |
| A4: | −2.8633E-02 | −5.0417E-02 | −6.3117E-02 | −3.3113E-02 | −1.1200E-02 | −6.4175E-02 | −3.4349E-02 |
| A6: | −1.0830E-02 | 3.2017E-02 | 5.3027E-02 | 2.7480E-02 | 2.1840E-02 | 1.4850E-02 | 8.5173E-03 |
| A8: | 2.5313E-02 | −3.5139E-02 | −4.8188E-02 | −1.7035E-02 | −9.0972E-03 | −1.2517E-03 | −1.4548E-03 |
| A10: | −3.0889E-02 | 2.3214E-02 | 2.4844E-02 | 3.7934E-03 | 1.6370E-03 | 5.8934E-05 | 1.5716E-04 |
| A12: | 2.3787E-02 | −9.7002E-03 | −7.7977E-03 | 3.4987E-05 | −1.1626E-04 | −1.3204E-05 | −1.1098E-05 |
| A14: | −1.1635E-02 | 2.5511E-03 | 1.5215E-03 | −2.0205E-04 | −4.5974E-06 | 2.5366E-06 | 5.2360E-07 |
| A16: | 3.4505E-03 | −4.1426E-04 | −1.7854E-04 | 44644E-05 | 1.3680E-06 | −2.2040E-07 | −1.6000E-08 |
| A18: | −5.6457E-04 | 3.7960E-05 | 1.1454E-05 | −4.1832E-06 | −8.7000E-08 | 9.1000E-09 | 3.0000E-10 |
| A20: | 3.9102E-05 | −1.4830E-06 | −3.0720E-07 | 1.4810E-07 | 1.9000E-09 | −1.0000E-10 | 0.0000E+00 |

In the second embodiment, an aspheric curve equation is expressed as that in the first embodiment. In addition, definitions of parameters in the following tables are the same as those in the first embodiment, and are not repeated herein.

Referring to Table 3 and Table 4, the following data may be calculated:

| Second embodiment | | | |
|---|---|---|---|
| HFOV*BFL | 51.21 | R11/R10 | 1.80 |
| R7*R8 | −449.60 | R8/R12 | 4.39 |
| T45/T67 | 0.64 | T12/T23 | 0.11 |
| T67*R11/CT6 | 6.57 | CT7*R14/R10 | 0.42 |
| BFLM/SL | 0.15 | f6/f4 | 0.25 |
| R2/T12 | 221.52 | R5*R6/R9*R10 | 27.58 |
| f/(R6 + R10) | 0.37 | R7*R8/R9*R10 | −34.09 |

Third Embodiment

Figure 3A:
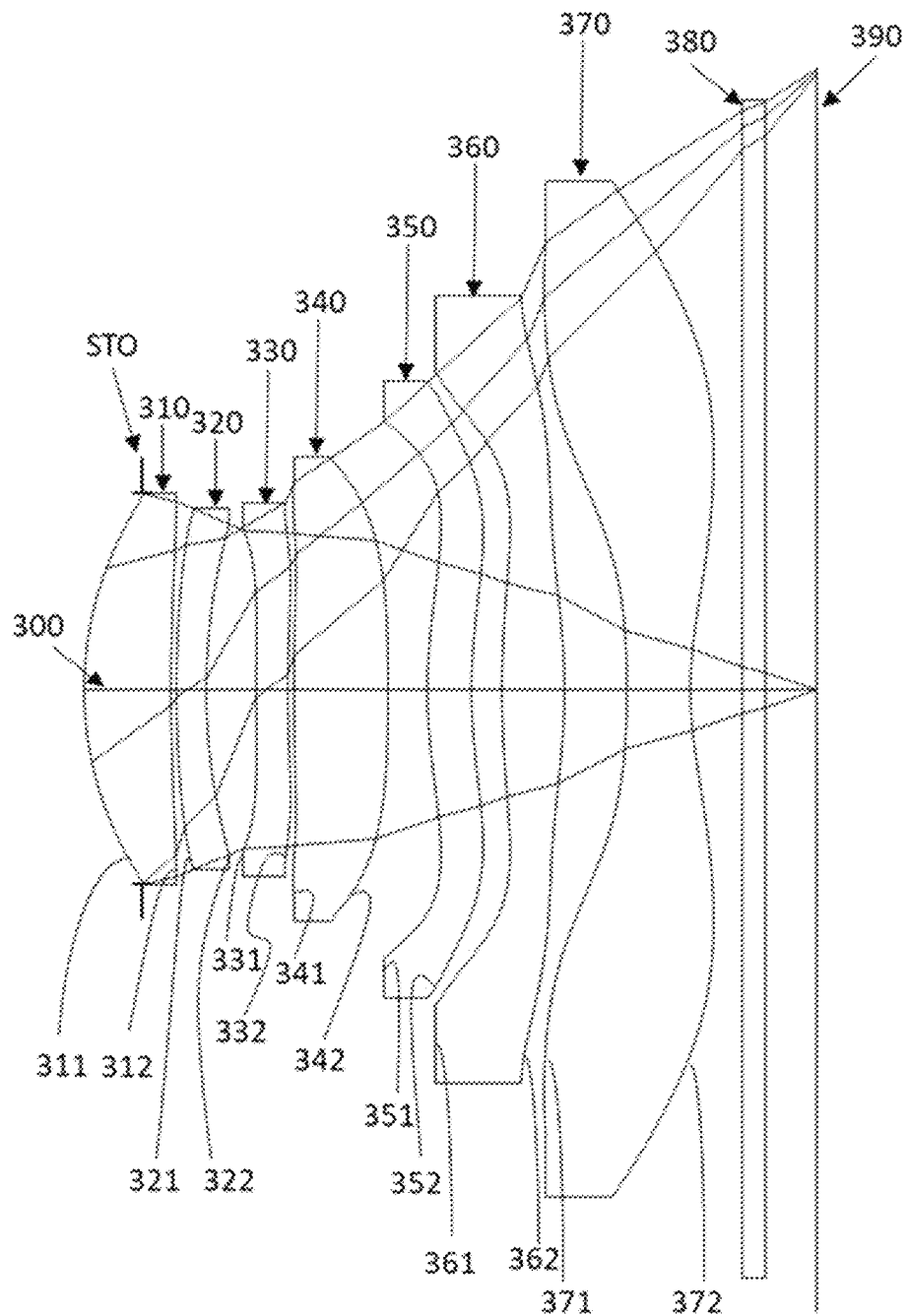
FIG. 3A is a schematic view of an optical lens assembly according to a third embodiment of the present disclosure.
Figure 3B:
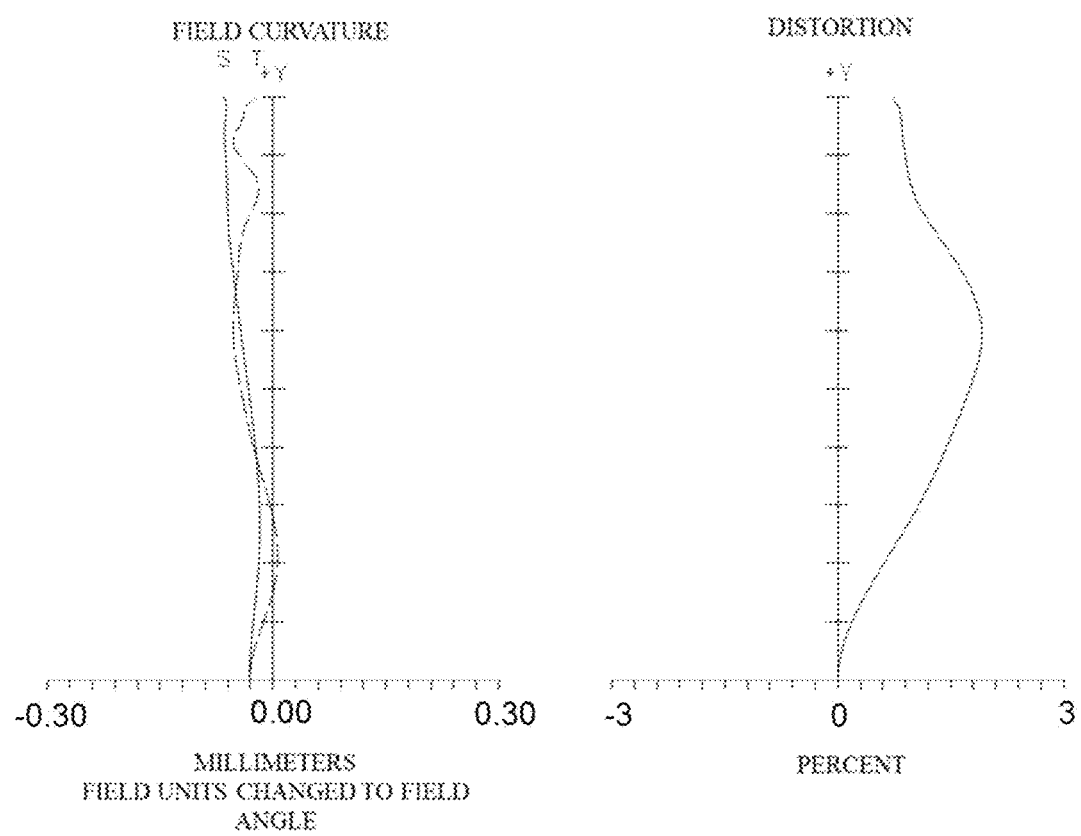
FIG. 3B shows a field curvature curves and a distortion curve of the optical lens assembly of the third embodiment.

Refer to FIG. 3A and FIG. 3B. FIG. 3A is a schematic view of an optical lens assembly according to a third embodiment of the present disclosure, and FIG. 3B shows a field curvature curve and a distortion curve of an optical lens assembly according to a second embodiment. As can be seen from FIG. 3A, the optical lens assembly includes a stop STO and includes, in order from an object side to an image side: a first lens 310, a second lens 320, a third lens 330, a fourth lens 340, a fifth lens 350, a sixth lens 360, a seventh lens 370, an IR-cut filter 380, and an image plane 390. A total quantity of lenses with refractive power in the optical lens assembly is seven, but not limited thereto.

The first lens 310 with positive refractive power is made of a plastic material and includes an object-side surface 311 and an image-side surface 312, wherein the object-side surface 311 of the first lens 310 is convex near an optical axis 300, and the image-side surface 312 of the first lens 310 is concave near the optical axis 300. The object-side surface 311 and the image-side surface 312 are aspheric.

The second lens 320 with negative refractive power is made of a plastic material and includes an object-side surface 321 and an image-side surface 322, wherein the object-side surface 321 of the second lens 320 is convex near the optical axis 300, and the image-side surface 322 of the second lens 320 is concave near the optical axis 300. The object-side surface 321 and the image-side surface 322 are aspheric.

The third lens 330 with negative refractive power is made of a plastic material and includes an object-side surface 331 and an image-side surface 332, wherein the object-side surface 331 of the third lens 330 is convex near an optical axis 300, and the image-side surface 332 of the third lens 330 is concave near the optical axis 300. The object-side surface 331 and the image-side surface 332 are aspheric.

The fourth lens 340 with positive refractive power is made of a plastic material and includes an object-side surface 341 and an image-side surface 342, wherein the object-side surface 341 of the fourth lens 340 is convex near an optical axis 300, and the image-side surface 342 of the fourth lens 340 is convex near the optical axis 300. The object-side surface 341 and the image-side surface 342 are aspheric.

The fifth lens 350 with positive refractive power is made of a plastic material and includes an object-side surface 351 and an image-side surface 352, wherein the object-side surface 351 of the fifth lens 350 is convex near the optical axis 300, and the image-side surface 352 of the fifth lens 350 is concave near the optical axis 300. The object-side surface 351 and the image-side surface 352 are aspheric.

The sixth lens 360 with positive refractive power is made of a plastic material and includes an object-side surface 361 and an image-side surface 362, wherein the object-side surface 361 of the sixth lens 360 is convex near the optical axis 300, and the image-side surface 362 of the sixth lens 360 is convex near the optical axis 300. The object-side surface 361 and the image-side surface 362 are aspheric.

The seventh lens 370 with negative refractive power is made of a plastic material and includes an object-side surface 371 and an image-side surface 372, wherein the object-side surface 371 of the seventh lens 370 is concave near an optical axis 300, and the image-side surface 372 of the seventh lens 370 is concave near the optical axis 300. The object-side surface 371 and the image-side surface 372 are aspheric.

The IR-cut filter 380 is made of glass, and is disposed between the seventh lens 370 and the image plane 390 without affecting a focal length of the optical lens assembly. It can be understood that, the IR-cut filter 380 may also be formed on the surface of the above-mentioned lens. The IR-cut filter 380 may also be made of other materials.

Refer to Table 5 and Table 6 below.

TABLE 5

Third embodiment
f (focal length) = 5.50 mm (millimeters), Fno (f-number) = 1.70, FOV (field of view 2ω) = 85.0 deg (degree).

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | Stop | Infinity | | −0.559 | | | | |
| 2 | First lens | 2.508 | (ASP) | 0.831 | Plastic | 1.54 | 55.99 | 5.59 |
| 3 | | 12.404 | (ASP) | 0.051 | | | | |
| 4 | Second lens | 7.863 | (ASP) | 0.280 | Plastic | 1.66 | 20.37 | −16.48 |
| 5 | | 4.518 | (ASP) | 0.475 | | | | |
| 6 | Third lens | 31.101 | (ASP) | 0.302 | Plastic | 1.67 | 19.24 | −25.37 |
| 7 | | 11.026 | (ASP) | 0.069 | | | | |
| 8 | Fourth lens | 23.620 | (ASP) | 0.885 | Plastic | 1.54 | 55.99 | 18.70 |
| 9 | | −17.757 | (ASP) | 0.383 | | | | |
| 10 | Fifth lens | 3.571 | (ASP) | 0.420 | Plastic | 1.57 | 37.67 | 250.31 |
| 11 | | 3.504 | (ASP) | 0.294 | | | | |
| 12 | Sixth lens | 6.300 | (ASP) | 0.585 | Plastic | 1.54 | 55.99 | 4.84 |
| 13 | | −4.409 | (ASP) | 0.604 | | | | |
| 14 | Seventh lens | −7.658 | (ASP) | 0.601 | Plastic | 1.54 | 55.99 | −3.41 |
| 15 | | 2.526 | (ASP) | 0.500 | | | | |
| 16 | IR-cut filter | Infinity | | 0.210 | Glass | 1.52 | 64.20 | |
| 17 | | Infinity | | 0.491 | | | | |
| 18 | Image Plane | Infinity | | — | | | | |

Reference wavelength 555 nm

TABLE 6

Aspheric coefficient

| Surface # | 2 | 3 | 4 | 5 | 6 | 7 | 8 |
|---|---|---|---|---|---|---|---|
| K: | −9.1224E+00 | 7.6232E+00 | 1.5573E+01 | −5.1317E+00 | −9.9000E+01 | −1.9115E+01 | 6.9383E+01 |
| A2: | 0.0000E+00 | 0.0000E+00 | 0.0000E+00 | 0.0000E+00 | 0.0000E+00 | 0.0000E+00 | 0.0000E+00 |
| A4: | 7.6497E−02 | −1.7466E−02 | −2.7172E−02 | 9.6497E−03 | −2.0974E−02 | 7.8815E−03 | 1.0977E−02 |
| A6: | −6.3465E−02 | −5.7666E−03 | 4.7319E−02 | −6.3642E−03 | −4.4683E−02 | −1.1357E−01 | −5.9795E−02 |
| A8: | 8.6903E−02 | 5.7517E−02 | −7.7594E−02 | 3.2159E−02 | 6.9373E−02 | 2.2606E−01 | 1.0123E−01 |
| A10: | −1.0151E−01 | −1.0691E−01 | 9.9884E−02 | −7.0299E−02 | −7.7560E−02 | −2.9108E−01 | −1.0108E−01 |
| A12: | 8.0858E−02 | 1.0789E−01 | −8.8050E−02 | 8.3500E−02 | 4.3345E−02 | 2.3550E−01 | 5.4959E−02 |
| A14: | −4.1172E−02 | −6.5492E−02 | 5.0908E−02 | −5.8478E−02 | −5.5389E−03 | −1.2248E−01 | −1.5561E−02 |
| A16: | 1.2750E−02 | 2.3670E−02 | −1.8474E−02 | 2.3523E−02 | −7.0602E−03 | 4.0442E−02 | 1.8672E−03 |
| A18: | −2.1841E−03 | −4.6763E−03 | 3.8519E−03 | −4.8949E−03 | 3.9735E−03 | −7.6613E−03 | 3.5659E−05 |
| A20: | 1.5828E−04 | 3.8729E−04 | −3.5364E−04 | 3.9177E−04 | −6.5676E−04 | 6.2695E−04 | −1.9911E−05 |

| Surface | 9 | 10 | 11 | 12 | 13 | 14 | 15 |
|---|---|---|---|---|---|---|---|
| K: | 5.7041E+01 | −1.2530E+00 | −3.7156E+00 | −1.9513E−01 | −3.4295E+01 | −4.6373E+01 | −8.8254E+00 |
| A2: | 0.0000E+00 | 0.0000E+00 | 0.0000E+00 | 0.0000E+00 | 0.0000E+00 | 0.0000E+00 | 0.0000E+00 |
| A4: | −2.8361E−02 | −5.3337E−02 | −6.6257E−02 | −3.1958E−02 | −1.2233E−02 | −7.0739E−02 | −3.2752E−02 |
| A6: | −1.1329E−02 | 3.7193E−02 | 5.7148E−02 | 2.3017E−02 | 2.0395E−02 | 1.9817E−02 | 8.4207E−03 |
| A8: | 2.5152E−02 | −3.9729E−02 | −5.1981E−02 | −1.3476E−02 | −7.7787E−03 | −2.9349E−03 | −1.5227E−03 |
| A10: | −2.9812E−02 | 2.5609E−02 | 2.7002E−02 | 1.9499E−03 | 1.2140E−03 | 3.8236E−04 | 1.7893E−04 |
| A12: | 2.2458E−02 | −1.0457E−02 | −8.5384E−03 | 7.4193E−04 | −4.7433E−05 | −5.1329E−05 | −1.4475E−05 |
| A14: | −1.0807E−02 | 2.6884E−03 | 1.6748E−03 | −3.8107E−04 | −1.0607E−05 | 5.3518E−06 | 8.3100E−07 |
| A16: | 3.1696E−03 | −4.2722E−04 | −1.9742E−04 | 7.1579E−05 | 1.6266E−06 | −3.4760E−07 | −3.2400E−08 |
| A18: | −5.1497E−04 | 3.8450E−05 | 1.2748E−05 | −6.3416E−06 | −9.0400E−08 | 1.2300E−08 | 8.0000E−10 |
| A20: | 3.5544E−05 | −1.4829E−06 | −3.4600E−07 | 2.1880E−07 | 1.9000E−09 | −2.0000E−10 | 0.0000E+00 |

In the third embodiment, an aspheric curve equation is expressed as that in the first embodiment. In addition, definitions of parameters in the following tables are the same as those in the first embodiment, and are not repeated herein.

Referring to Table 5 and Table 6, the following data may be calculated:

| Third embodiment | | | |
|---|---|---|---|
| HFOV*BFL | 51.03 | R11/R10 | 1.80 |
| R7*R8 | −419.44 | R8/R12 | 4.03 |
| T45/T67 | 0.63 | T12/T23 | 0.11 |
| T67*R11/CT6 | 6.50 | CT7*R14/R10 | 0.43 |
| BFLM/SL | 0.15 | f6/f4 | 0.26 |
| R2/T12 | 243.22 | R5*R6/R9*R10 | 27.41 |
| f/(R6 + R10) | 0.38 | R7*R8/R9*R10 | −33.52 |

Fourth Embodiment

Figure 4A:
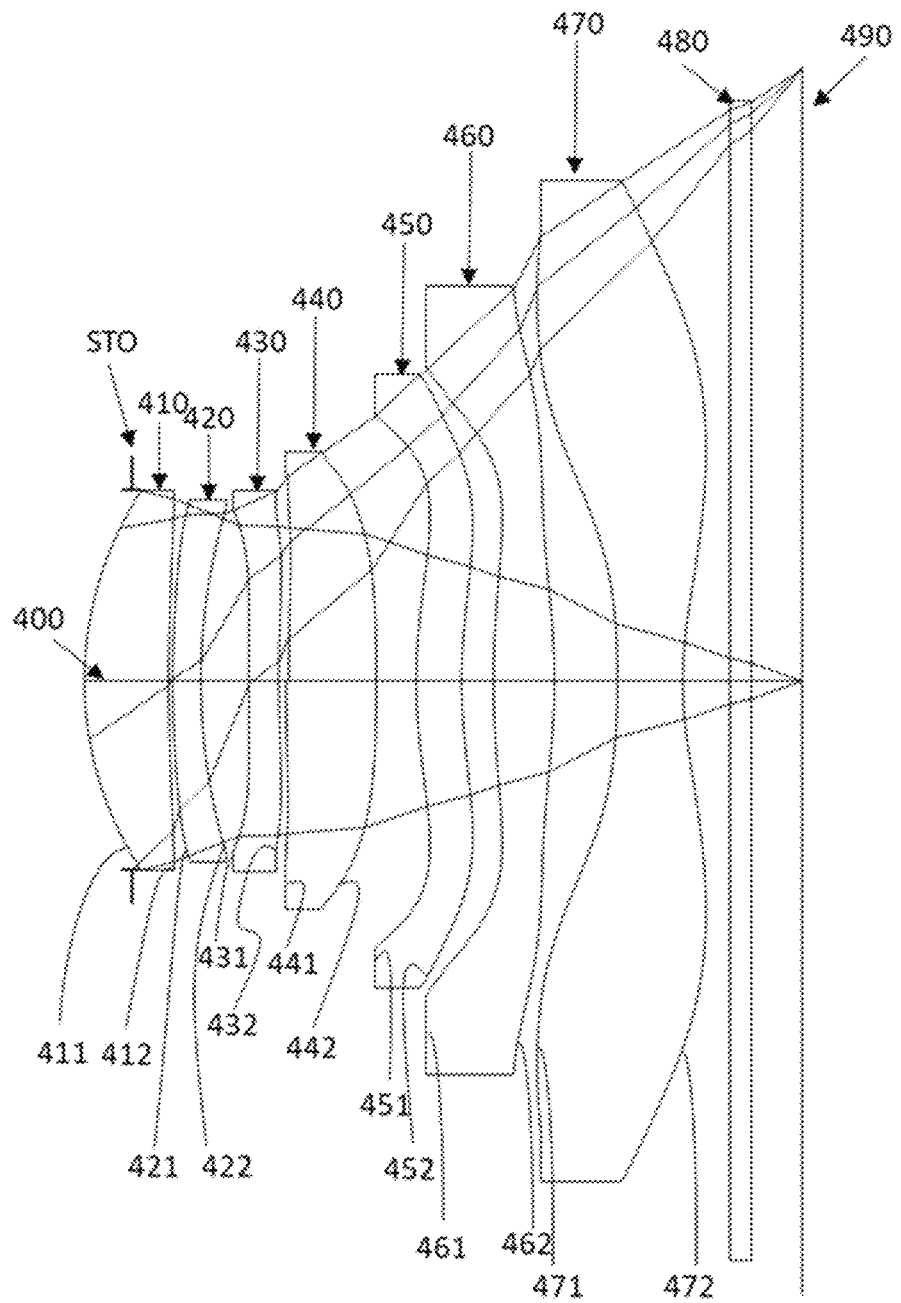
FIG. 4A is a schematic view of an optical lens assembly according to a fourth embodiment of the present disclosure.
Figure 4B:
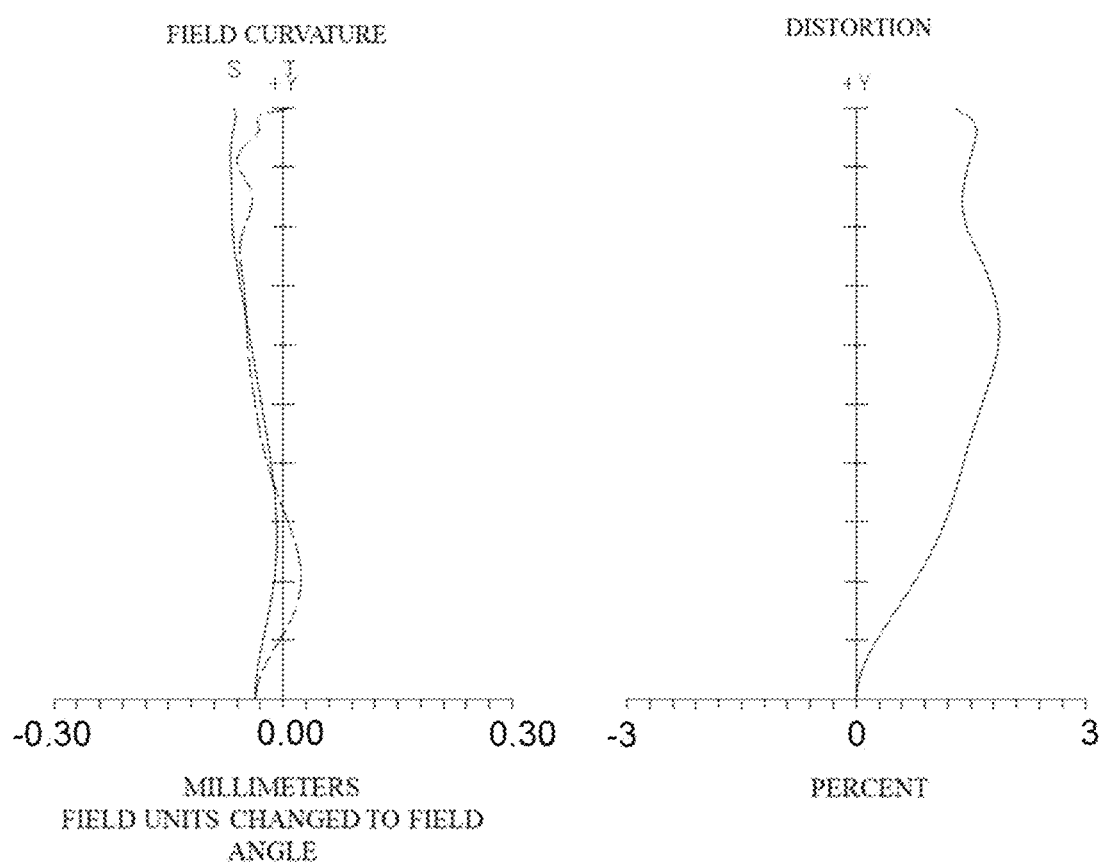
FIG. 4B shows a field curvature curves and a distortion curve of the optical lens assembly of the fourth embodiment.

Refer to FIG. 4A and FIG. 4B. FIG. 4A is a schematic view of an optical lens assembly according to a fourth embodiment of the present disclosure, and FIG. 4B shows a field curvature curve and a distortion curve of an optical lens assembly according to a second embodiment. As can be seen from FIG. 4A, the optical lens assembly includes a stop STO and includes, in order from an object side to an image side: a first lens 410, a second lens 420, a third lens 430, a fourth lens 440, a fifth lens 450, a sixth lens 460, a seventh lens 470, an IR-cut filter 480, and an image plane 490. A total quantity of lenses with refractive power in the optical lens assembly is seven, but not limited thereto.

The first lens 410 with positive refractive power is made of a plastic material and includes an object-side surface 411 and an image-side surface 412, wherein the object-side surface 411 of the first lens 410 is convex near an optical axis 400, and the image-side surface 412 of the first lens 410 is concave near the optical axis 400. The object-side surface 411 and the image-side surface 412 are aspheric.

The second lens 420 with negative refractive power is made of a plastic material and includes an object-side surface 421 and an image-side surface 422, wherein the object-side surface 421 of the second lens 420 is convex near the optical axis 400, and the image-side surface 422 of the second lens 420 is concave near the optical axis 400. The object-side surface 421 and the image-side surface 422 are aspheric.

The third lens 430 with negative refractive power is made of a plastic material and includes an object-side surface 431 and an image-side surface 432, wherein the object-side surface 431 of the third lens 430 is convex near an optical axis 400, and the image-side surface 432 of the third lens 430 is concave near the optical axis 400. The object-side surface 431 and the image-side surface 432 are aspheric.

The fourth lens 440 with positive refractive power is made of a plastic material and includes an object-side surface 441 and an image-side surface 442, wherein the object-side surface 441 of the fourth lens 440 is convex near an optical axis 400, and the image-side surface 442 of the fourth lens 440 is convex near the optical axis 400. The object-side surface 441 and the image-side surface 442 are aspheric.

The fifth lens 450 with positive refractive power is made of a plastic material and includes an object-side surface 451 and an image-side surface 452, wherein the object-side surface 451 of the fifth lens 450 is convex near the optical axis 400, and the image-side surface 452 of the fifth lens 450 is concave near the optical axis 400. The object-side surface 451 and the image-side surface 452 are aspheric.

The sixth lens 460 with positive refractive power is made of a plastic material and includes an object-side surface 461 and an image-side surface 462, wherein the object-side surface 461 of the sixth lens 460 is convex near the optical axis 400, and the image-side surface 462 of the sixth lens 460 is convex near the optical axis 400. The object-side surface 461 and the image-side surface 462 are aspheric.

The seventh lens 470 with negative refractive power is made of a plastic material and includes an object-side surface 471 and an image-side surface 472, wherein the object-side surface 471 of the seventh lens 470 is concave near an optical axis 400, and the image-side surface 472 of the seventh lens 470 is concave near the optical axis 400. The object-side surface 471 and the image-side surface 472 are aspheric.

The IR-cut filter 480 is made of glass, and is disposed between the seventh lens 470 and the image plane 490 without affecting a focal length of the optical lens assembly. It can be understood that, the IR-cut filter 480 may also be formed on the surface of the above-mentioned lens. The IR-cut filter 480 may also be made of other materials.

Refer to Table 7 and Table 8 below.

TABLE 7

Fourth embodiment
f (focal length) = 5.38 mm (millimeters), Fno (f-number) = 1.70, FOV (field of view 2ω) = 85.9 deg (degree).

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | Stop | Infinity | | −0.462 | | | | |
| 2 | First lens | 2.520 | (ASP) | 0.808 | Plastic | 1.54 | 55.99 | 5.61 |
| 3 | | 12.515 | (ASP) | 0.043 | | | | |
| 4 | Second lens | 7.868 | (ASP) | 0.271 | Plastic | 1.66 | 20.37 | −16.42 |
| 5 | | 4.516 | (ASP) | 0.469 | | | | |
| 6 | Third lens | 29.864 | (ASP) | 0.287 | Plastic | 1.67 | 19.24 | −25.55 |
| 7 | | 10.917 | (ASP) | 0.070 | | | | |
| 8 | Fourth lens | 22.690 | (ASP) | 0.871 | Plastic | 1.54 | 55.99 | 18.11 |
| 9 | | −17.308 | (ASP) | 0.373 | | | | |
| 10 | Fifth lens | 3.507 | (ASP) | 0.441 | Plastic | 1.57 | 37.67 | 126.24 |
| 11 | | 3.515 | (ASP) | 0.302 | | | | |
| 12 | Sixth lens | 6.096 | (ASP) | 0.592 | Plastic | 1.54 | 55.99 | 4.84 |

TABLE 7-continued

Fourth embodiment
f (focal length) = 5.38 mm (millimeters), Fno (f-number) = 1.70, FOV (field of view 2ω) = 85.9 deg (degree).

| Surface # | | Radius of curvature (mm) | | Central thickness/gap (mm) | Material | Refractive index (nd) | Abbe number (vd) | Focal length (mm) |
|---|---|---|---|---|---|---|---|---|
| 13 | | −4.513 | (ASP) | 0.611 | | | | |
| 14 | Seventh lens | −6.948 | (ASP) | 0.619 | Plastic | 1.54 | 55.99 | −3.38 |
| 15 | | 2.592 | (ASP) | 0.459 | | | | |
| 16 | IR-cut filter | Infinity | | 0.210 | Glass | 1.52 | 64.20 | |
| 17 | | Infinity | | 0.491 | | | | |
| 18 | Image Plane | Infinity | | — | | | | |

Reference wavelength 555 nm

TABLE 8

Aspheric coefficient

| Surface # | 2 | 3 | 4 | 5 | 6 | 7 | 8 |
|---|---|---|---|---|---|---|---|
| K: | −9.1465E+00 | 9.1187E+00 | 1.5504E+01 | −4.9475E+00 | −2.8856E+01 | −1.9499E+01 | 7.6557E+01 |
| A2: | 0.0000E+00 | 0.0000E+00 | 0.0000E+00 | 0.0000E+00 | 0.0000E+00 | 0.0000E+00 | 0.0000E+00 |
| A4: | 7.6407E−02 | −1.7384E−02 | −2.7427E−02 | 9.7964E−02 | −2.0759E−02 | 7.8507E−03 | 1.1229E−02 |
| A6: | −6.3461E−02 | −5.7645E−03 | 4.7274E−02 | −6.3327E−03 | −4.4649E−02 | −1.1359E−01 | −5.9807E−02 |
| A8: | 8.6909E−02 | 5.7515E−02 | −7.7602E−02 | 3.2166E−02 | 6.9391E−02 | 2.2604E−01 | 1.0123E−01 |
| A10: | −1.0151E−01 | −1.0691E−01 | 9.9884E−02 | −7.0297E−02 | −7.7550E−02 | −2.9109E−01 | −1.0108E−01 |
| A12: | 8.0857E−02 | 1.0789E−01 | −8.8049E−02 | 8.3501E−02 | 4.3350E−02 | 2.3550E−01 | 5.4958E−02 |
| A14: | −4.1173E−02 | −6.5492E−02 | 5.0908E−02 | −5.8478E−02 | −5.5374E−03 | −1.2248E−01 | −1.5562E−02 |
| A16: | 1.2750E−02 | 2.3670E−02 | −1.8474E−02 | 2.3523E−02 | −7.0599E−03 | 4.0442E−02 | 1.8670E−03 |
| A18: | −2.1842E−03 | −4.6763E−03 | 3.8520E−03 | −4.8950E−03 | 3.9734E−03 | −7.6614E−03 | 3.5397E−05 |
| A20: | 1.5826E−04 | 3.8732E−04 | −3.5363E−04 | 3.9176E−04 | −6.5689E−04 | 6.2690E−04 | −2.0003E−05 |

| Surface # | 9 | 10 | 11 | 12 | 13 | 14 | 15 |
|---|---|---|---|---|---|---|---|
| K: | 5.8612E+01 | −1.2530E+00 | −3.7975E+00 | 1.1367E−02 | −4.4740E+01 | −5.4081E+01 | −8.8956E+00 |
| A2: | 0.0000E+00 | 0.0000E+00 | 0.0000E+00 | 0.0000E+00 | 0.0000E+00 | 0.0000E+00 | 0.0000E+00 |
| A4: | −2.8529E−02 | −5.3219E−02 | −6.6067E−02 | −3.2105E−02 | −1.2316E−02 | −7.0699E−02 | −3.2637E−02 |
| A6: | −1.1387E−02 | 3.7173E−02 | 5.7153E−02 | 2.2940E−02 | 2.0388E−02 | 1.9821E−02 | 8.4381E−03 |
| A8: | 2.5145E−02 | −3.9737E−02 | −5.1975E−02 | −1.3478E−02 | −7.7787E−03 | −2.9347E−03 | −1.5223E−03 |
| A10: | −2.9811E−02 | 2.5608E−02 | 2.7002E−02 | 1.9497E−03 | 1.2140E−03 | 3.8237E−04 | 1.7894E−04 |
| A12: | 2.2458E−02 | −1.0456E−02 | −8.5384E−03 | 7.4192E−04 | −4.7438E−05 | −5.1329E−05 | −1.4475E−05 |
| A14: | −1.0807E−02 | 2.6884E−03 | 1.6748E−03 | −3.8106E−04 | −1.0607E−05 | 5.3518E−06 | 8.3100E−07 |
| A16: | 3.1696E−03 | −4.2722E−04 | −1.9742E−04 | 7.1579E−05 | 1.6266E−06 | −3.4760E−07 | −3.2400E−08 |
| A18: | −5.1495E−04 | 3.8450E−05 | 1.2748E−05 | −6.3416E−06 | −9.0400E−08 | 1.2300E−08 | 8.0000E−10 |
| A20: | 3.5547E−05 | −1.4830E−06 | −3.4600E−07 | 2.1890E−07 | 1.9000E−09 | −2.0000E−10 | 0.0000E+00 |

In the Fourth embodiment, an aspheric curve equation is expressed as that in the first embodiment. In addition, definitions of parameters in the following tables are the same as those in the first embodiment, and are not repeated herein.

Referring to Table 7 and Table 8, the following data may be calculated:

| Fourth embodiment | | | |
|---|---|---|---|
| HFOV*BFL | 49.76 | R11/R10 | 1.73 |
| R7*R8 | −392.72 | R8/R12 | 3.84 |
| T45/T67 | 0.61 | T12/T23 | 0.09 |
| T67*R11/CT6 | 6.29 | CT7*R14/R10 | 0.46 |
| BFLM/SL | 0.15 | f6/f4 | 0.27 |
| R2/T12 | 292.27 | R5*R6/R9*R10 | 26.45 |
| f/(R6 + R10) | 0.37 | R7*R8/R9*R10 | −31.86 |

Fifth Embodiment

Figure 5A:
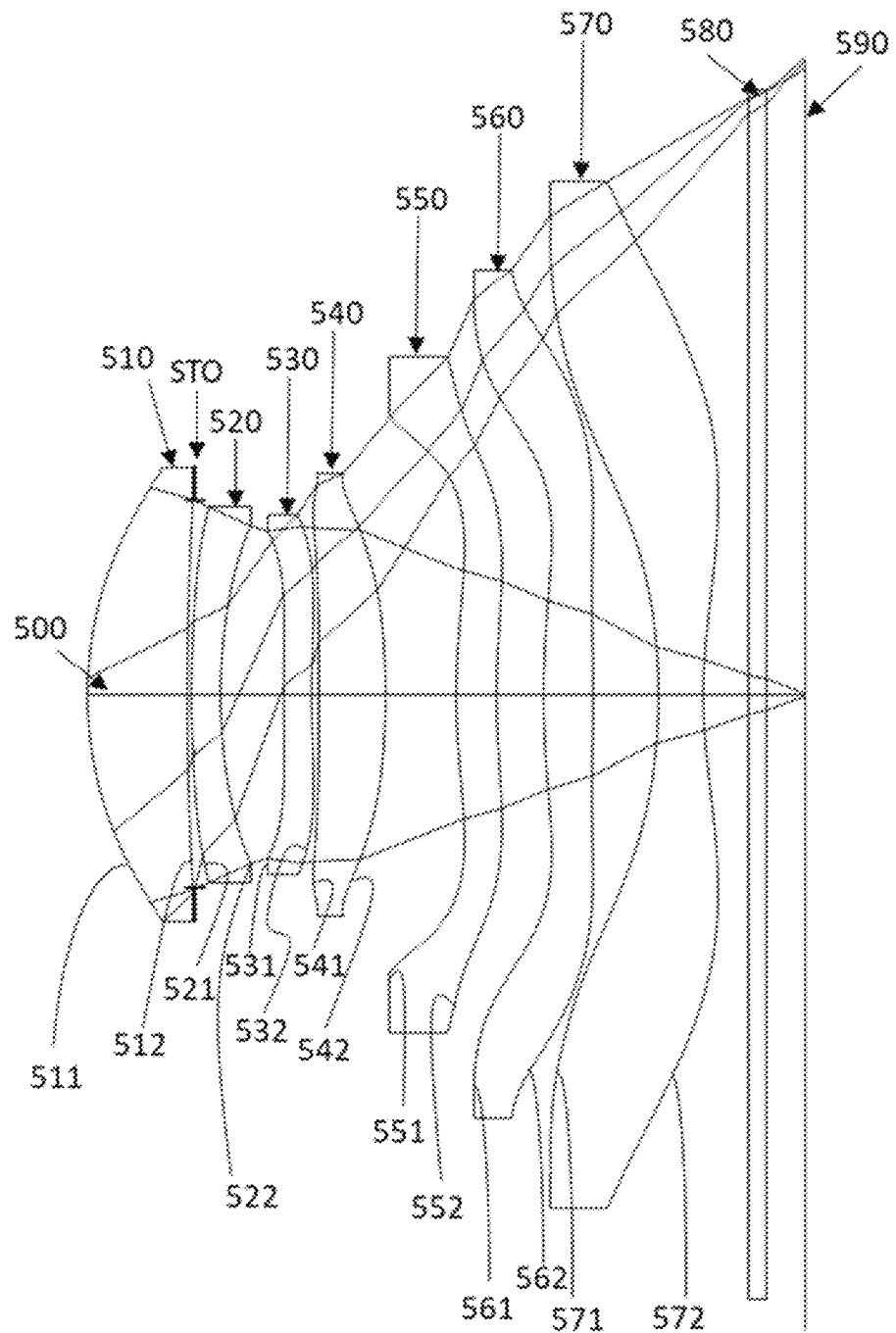
FIG. 5A is a schematic view of an optical lens assembly according to a fifth embodiment of the present disclosure.
Figure 5B:
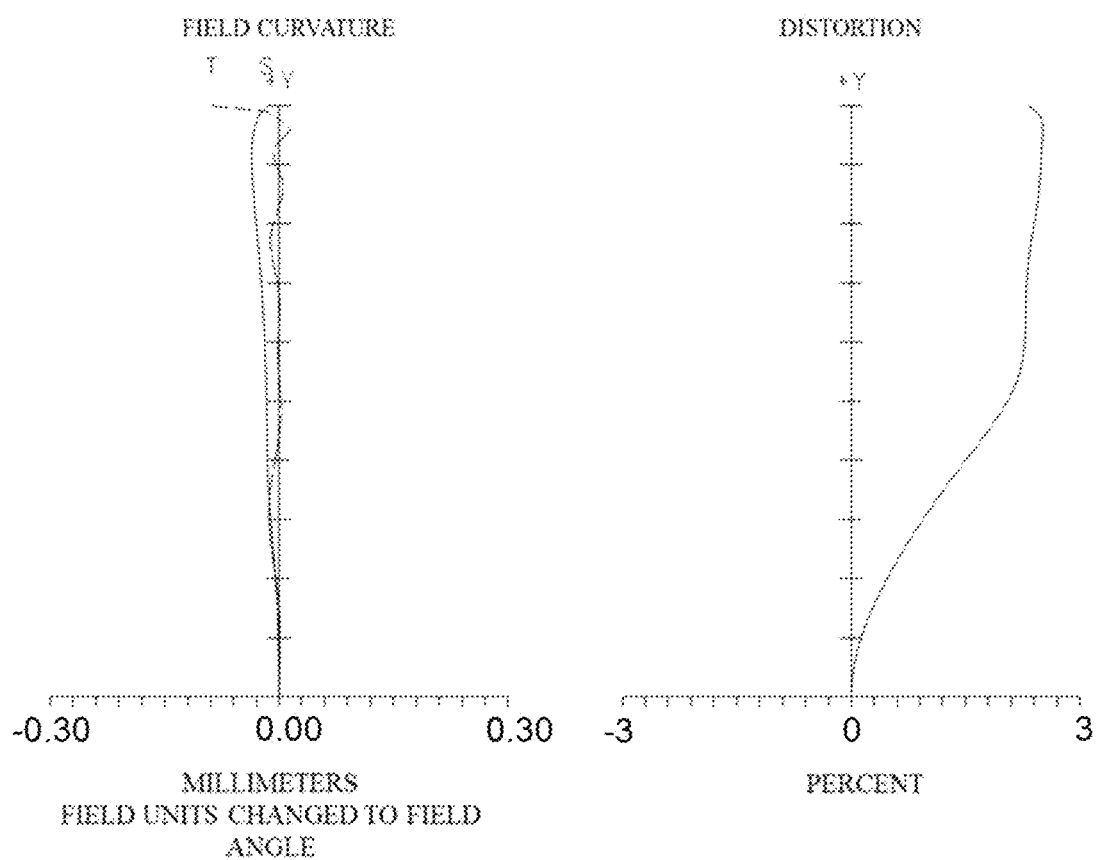
FIG. 5B shows a field curvature curves and a distortion curve of the optical lens assembly of the fifth embodiment.

Refer to FIG. 5A and FIG. 5B. FIG. 5A is a schematic view of an optical lens assembly according to a fifth embodiment of the present disclosure, and FIG. 5B shows a field curvature curve and a distortion curve of an optical lens assembly according to a second embodiment. As can be seen from FIG. 5A, the optical lens assembly includes a stop STO and includes, in order from an object side to an image side: a first lens 510, a second lens 520, a third lens 530, a fourth lens 540, a fifth lens 550, a sixth lens 560, a seventh lens 570, an IR-cut filter 580, and an image plane 590. A total quantity of lenses with refractive power in the optical lens assembly is seven, but not limited thereto.

The first lens 510 with positive refractive power is made of a plastic material and includes an object-side surface 511 and an image-side surface 512, wherein the object-side surface 511 of the first lens 510 is convex near an optical axis 500, and the image-side surface 512 of the first lens 510 is concave near the optical axis 500. The object-side surface 511 and the image-side surface 512 are aspheric.

The second lens 520 with negative refractive power is made of a plastic material and includes an object-side surface 521 and an image-side surface 522, wherein the object-side surface 521 of the second lens 520 is convex near the optical axis 500, and the image-side surface 522 of the second lens 520 is concave near the optical axis 500. The object-side surface 521 and the image-side surface 522 are aspheric.

The third lens 530 with negative refractive power is made of a plastic material and includes an object-side surface 531 and an image-side surface 532, wherein the object-side surface 531 of the third lens 530 is convex near an optical axis 500, and the image-side surface 532 of the third lens 530 is concave near the optical axis 500. The object-side surface 531 and the image-side surface 532 are aspheric.

The fourth lens 540 with positive refractive power is made of a plastic material and includes an object-side surface 541 and an image-side surface 542, wherein the object-side surface 541 of the fourth lens 540 is convex near an optical axis 500, and the image-side surface 542 of the fourth lens 540 is convex near the optical axis 500. The object-side surface 541 and the image-side surface 542 are aspheric.

The fifth lens 550 with positive refractive power is made of a plastic material and includes an object-side surface 551 and an image-side surface 552, wherein the object-side surface 551 of the fifth lens 550 is convex near the optical axis 500, and the image-side surface 552 of the fifth lens 550 is concave near the optical axis 500. The object-side surface 551 and the image-side surface 552 are aspheric.

The sixth lens 560 with positive refractive power is made of a plastic material and includes an object-side surface 561 and an image-side surface 562, wherein the object-side surface 561 of the sixth lens 560 is convex near the optical axis 500, and the image-side surface 562 of the sixth lens 560 is convex near the optical axis 500. The object-side surface 561 and the image-side surface 562 are aspheric.

The seventh lens 570 with negative refractive power is made of a plastic material and includes an object-side surface 571 and an image-side surface 572, wherein the object-side surface 571 of the seventh lens 570 is concave near an optical axis 500, and the image-side surface 572 of the seventh lens 570 is concave near the optical axis 500. The object-side surface 571 and the image-side surface 572 are aspheric.

The IR-cut filter 580 is made of glass, and is disposed between the seventh lens 570 and the image plane 590 without affecting a focal length of the optical lens assembly. It can be understood that, the IR-cut filter 580 may also be formed on the surface of the above-mentioned lens. The IR-cut filter 580 may also be made of other materials.

Refer to Table 9 and Table 10 below.

TABLE 9

Fifth embodiment
f (focal length) = 6.51 mm (millimeters), Fno (f-number) = 1.63, FOV (field of view 2ω) = 85.0 deg (degree).

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | First lens | 3.114 | (ASP) | 1.108 | Glass | 1.59 | 61.25 | 6.37 |
| 2 | | 15.696 | (ASP) | 0.097 | | | | |
| 3 | Stop | Infinity | | −0.047 | | | | |
| 4 | Second lens | 7.865 | (ASP) | 0.312 | Plastic | 1.64 | 23.97 | −15.73 |
| 5 | | 4.348 | (ASP) | 0.711 | | | | |
| 6 | Third lens | 20.256 | (ASP) | 0.300 | Plastic | 1.67 | 19.24 | −28.13 |
| 7 | | 9.761 | (ASP) | 0.078 | | | | |
| 8 | Fourth lens | 122.002 | (ASP) | 0.750 | Plastic | 1.55 | 55.99 | 12.23 |
| 9 | | −7.055 | (ASP) | 0.771 | | | | |
| 10 | Fifth lens | 5.011 | (ASP) | 0.456 | Plastic | 1.57 | 37.43 | 57.96 |
| 11 | | 5.715 | (ASP) | 0.519 | | | | |
| 12 | Sixth lens | 7.395 | (ASP) | 0.550 | Plastic | 1.55 | 55.99 | 8.28 |
| 13 | | −11.335 | (ASP) | 0.713 | | | | |
| 14 | Seventh lens | −4.777 | (ASP) | 0.498 | Plastic | 1.55 | 55.99 | −4.08 |
| 15 | | 4.339 | (ASP) | 0.500 | | | | |
| 16 | IR-cut filter | Infinity | | 0.210 | Glass | 1.52 | 64.20 | |
| 17 | | Infinity | | 0.466 | | | | |
| 18 | Image Plane | Infinity | | — | | | | |

Reference wavelength 555 nm

TABLE 10

Aspheric coefficient

| Surface # | 2 | 3 | 4 | 5 | 6 | 7 | 8 |
|---|---|---|---|---|---|---|---|
| K: | −7.8764E+00 | 2.0603E+01 | 4.4396E+00 | −2.9791E+00 | −3.3631E+01 | −7.3664E+01 | −9.9000E+01 |
| A2: | 0.0000E+00 | 0.0000E+00 | 0.0000E+00 | 0.0000E+00 | 0.0000E+00 | 0.0000E+00 | 0.0000E+00 |
| A4: | 3.2326E−02 | −3.5639E−02 | −4.9530E−02 | −3.0763E−03 | −3.5200E−02 | −4.2156E−02 | −3.4139E−02 |
| A6: | −1.1122E−02 | 4.5358E−02 | 6.6783E−02 | −8.1104E−03 | 1.5126E−02 | 4.9604E−02 | 4.4202E−02 |
| A8: | 6.9355E−03 | −4.0892E−02 | −6.6664E−02 | 4.7640E−02 | −3.3050E−02 | −7.5599E−02 | −5.1403E−02 |
| A10: | −4.3895E−03 | 2.8131E−02 | 5.3694E−02 | −7.7824E−02 | 3.9586E−02 | 7.1387E−02 | 4.2991E−02 |

TABLE 10-continued

| Aspheric coefficient | | | | | | | |
|---|---|---|---|---|---|---|---|
| A12: | 2.0374E−03 | −1.4092E−02 | −3.1799E−02 | 7.2570E−02 | −3.2055E−02 | −4.4055E−02 | −2.4173E−02 |
| A14: | −6.1922E−04 | 4.8086E−03 | 1.2827E−02 | −4.1620E−02 | 1.6665E−02 | 1.7309E−02 | 8.6826E−03 |
| A16: | 1.1615E−04 | −1.0438E−03 | −3.2819E−03 | 1.4468E−02 | −5.3319E−03 | −4.1707E−03 | −1.8836E−03 |
| A18: | −1.2247E−05 | 1.2893E−04 | 4.7669E−04 | −2.7970E−03 | 9.4996E−04 | 5.6784E−04 | 2.2477E−04 |
| A20: | 5.5316E−07 | −6.8644E−06 | −2.9745E−05 | 2.3128E−04 | −7.0967E−05 | −3.3785E−05 | −1.1356E−05 |

| Surface # | 9 | 10 | 11 | 12 | 13 | 14 | 15 |
|---|---|---|---|---|---|---|---|
| K: | −2.5442E+01 | −5.3677E+00 | −4.7815E+00 | 1.2910E+00 | −1.7492E+01 | −1.6128E+01 | −1.1052E+00 |
| A2: | 0.0000E+00 | 0.0000E+00 | 0.0000E+00 | 0.0000E+00 | 0.0000E+00 | 0.0000E+00 | 0.0000E+00 |
| A4: | −3.6329E−02 | −3.2651E−02 | −3.9168E−02 | −5.6278E−03 | 3.6215E−02 | −1.5573E−02 | −2.9115E−02 |
| A6: | 1.7776E−02 | 1.3097E−02 | 1.0097E−02 | −4.7382E−03 | −1.2147E−02 | −1.3873E−03 | 3.8718E−03 |
| A8: | −1.8991E−02 | −8.6234E−03 | −3.1409E−03 | 1.2183E−03 | 2.0441E−03 | 1.0690E−03 | −3.4924E−04 |
| A10: | 1.6095E−02 | 4.2104E−03 | 6.8512E−04 | −3.7550E−04 | −2.4623E−04 | −1.7663E−04 | 5.5142E−06 |
| A12: | −8.9923E−03 | −1.5227E−03 | −1.2301E−04 | 7.6563E−05 | 2.3110E−05 | 1.5294E−05 | 2.2797E−06 |
| A14: | 3.2549E−03 | 3.6531E−04 | 1.9300E−05 | −8.3151E−06 | −1.6400E−06 | −7.8340E−07 | −2.4212E−07 |
| A16: | −7.3158E−04 | −5.3763E−05 | −2.0262E−06 | 4.8750E−07 | 7.8740E−08 | 2.3826E−08 | 1.1181E−08 |
| A18: | 9.2192E−05 | 4.3230E−06 | 1.1362E−07 | −1.4725E−08 | −2.1682E−09 | −3.9739E−10 | −2.5397E−10 |
| A20: | −4.9160E−06 | −1.4321E−07 | −2.5499E−09 | 1.8027E−10 | 2.5155E−11 | 2.7934E−12 | 2.3095E−12 |

In the Fifth embodiment, an aspheric curve equation is expressed as that in the first embodiment. In addition, definitions of parameters in the following tables are the same as those in the first embodiment, and are not repeated herein.

Referring to Table 9 and Table 10, the following data may be calculated:

| Fifth embodiment | | | |
|---|---|---|---|
| HFOV*BFL | 49.98 | R11/R10 | 1.29 |
| R7*R8 | −860.67 | R8/R12 | 0.62 |
| T45/T67 | 1.08 | T12/T23 | 0.07 |
| T67*R11/CT6 | 9.59 | CT7*R14/R10 | 0.38 |
| BFLM/SL | 0.15 | f6/f4 | 0.68 |
| R2/T12 | 313.91 | R5*R6/R9*R10 | 6.90 |
| f/(R6 + R10) | 0.42 | R7*R8/R9*R10 | −30.05 |

Sixth Embodiment

Figure 6A:
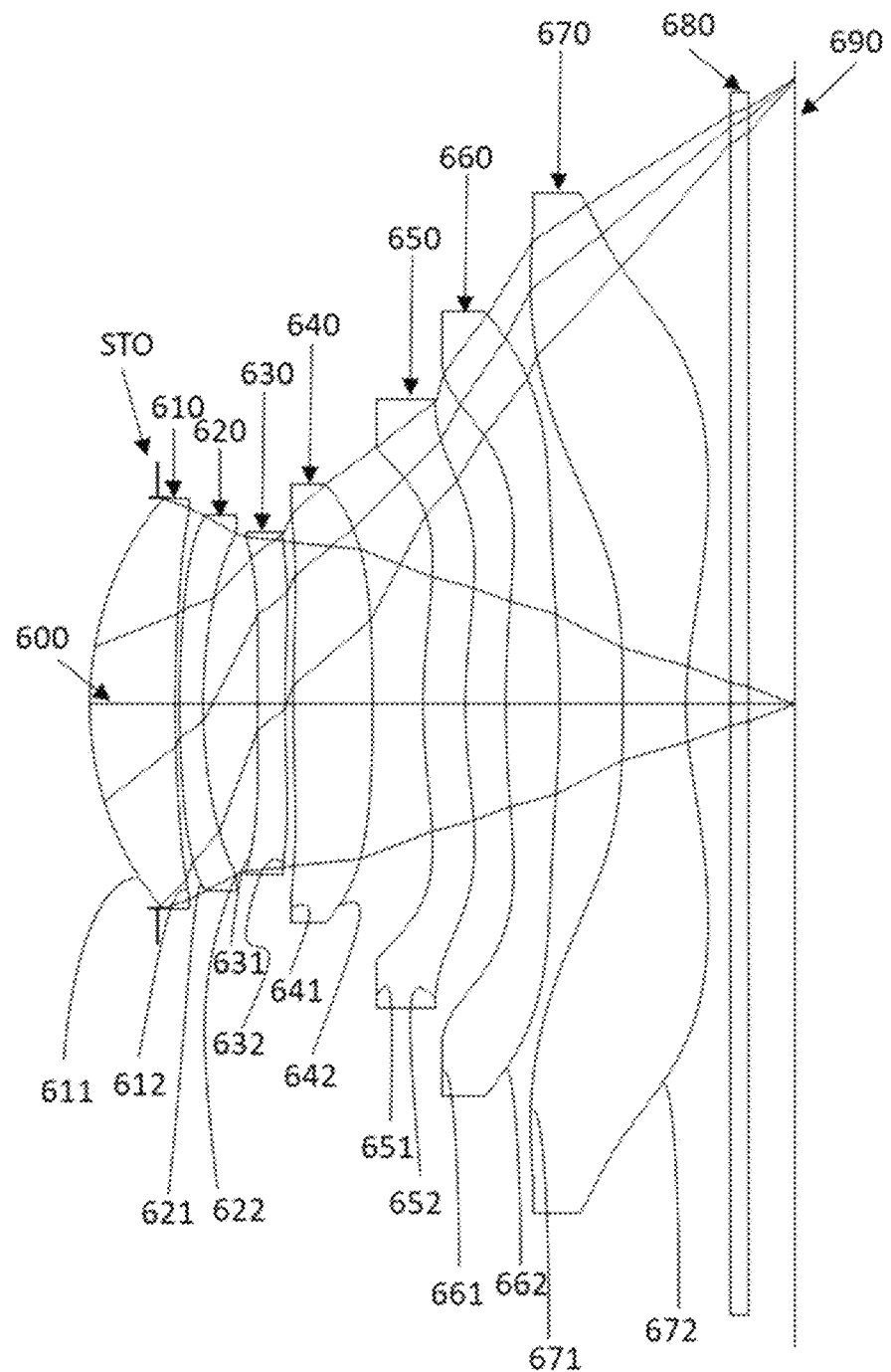
FIG. 6A is a schematic view of an optical lens assembly according to a sixth embodiment of the present disclosure.
Figure 6B:
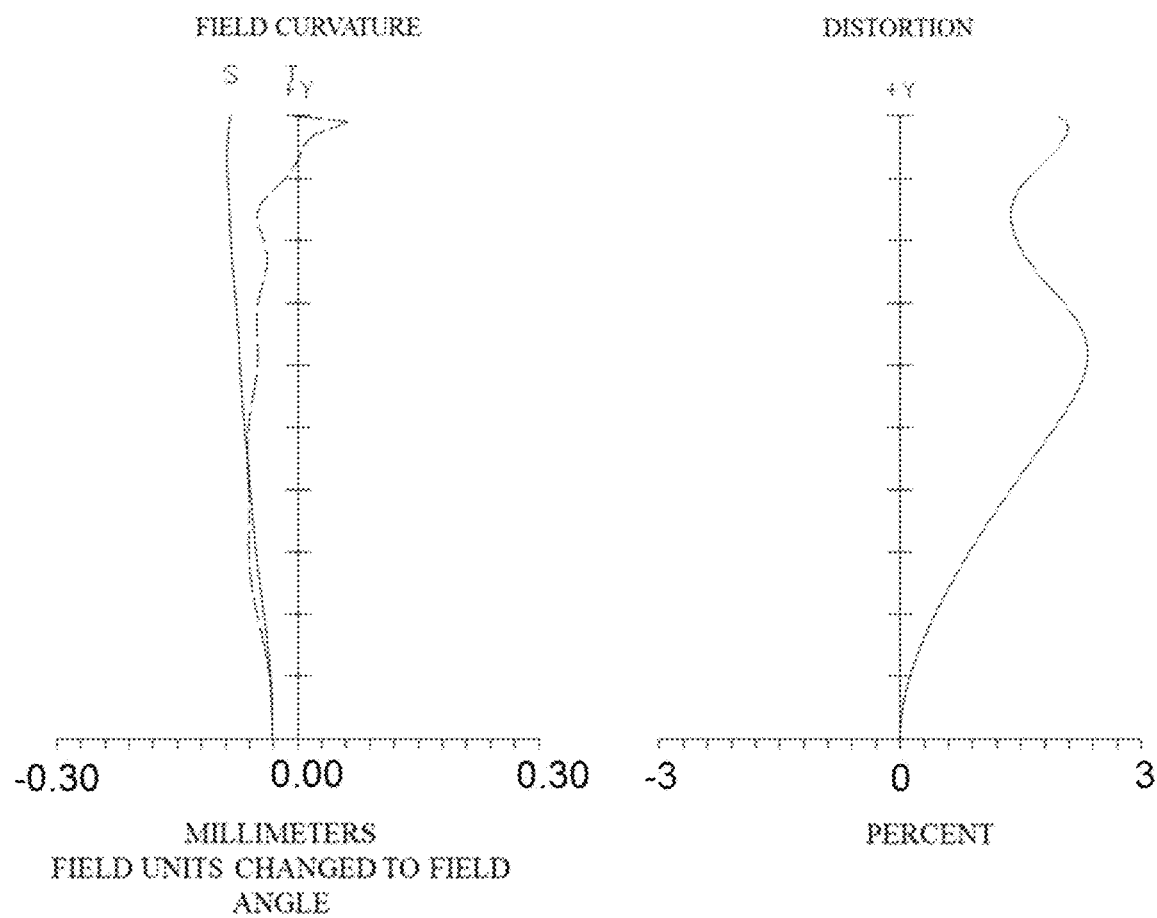
FIG. 6B shows a field curvature curves and a distortion curve of the optical lens assembly of the sixth embodiment.

Refer to FIG. 6A and FIG. 6B. FIG. 6A is a schematic view of an optical lens assembly according to a sixth embodiment of the present disclosure, and FIG. 6B shows a field curvature curve and a distortion curve of an optical lens assembly according to a second embodiment. As can be seen from FIG. 6A, the optical lens assembly includes a stop STO and includes, in order from an object side to an image side: a first lens 610, a second lens 620, a third lens 630, a fourth lens 640, a fifth lens 650, a sixth lens 660, a seventh lens 670, an IR-cut filter 680, and an image plane 690. A total quantity of lenses with refractive power in the optical lens assembly is seven, but not limited thereto.

The first lens 610 with positive refractive power is made of a plastic material and includes an object-side surface 611 and an image-side surface 612, wherein the object-side surface 611 of the first lens 610 is convex near an optical axis 600, and the image-side surface 612 of the first lens 610 is concave near the optical axis 600. The object-side surface 611 and the image-side surface 612 are aspheric.

The second lens 620 with negative refractive power is made of a plastic material and includes an object-side surface 621 and an image-side surface 622, wherein the object-side surface 621 of the second lens 620 is convex near the optical axis 600, and the image-side surface 622 of the second lens 620 is concave near the optical axis 600. The object-side surface 621 and the image-side surface 622 are aspheric.

The third lens 630 with negative refractive power is made of a plastic material and includes an object-side surface 631 and an image-side surface 632, wherein the object-side surface 631 of the third lens 630 is convex near an optical axis 600, and the image-side surface 632 of the third lens 630 is concave near the optical axis 600. The object-side surface 631 and the image-side surface 632 are aspheric.

The fourth lens 640 with positive refractive power is made of a plastic material and includes an object-side surface 641 and an image-side surface 642, wherein the object-side surface 641 of the fourth lens 640 is convex near an optical axis 600, and the image-side surface 642 of the fourth lens 640 is convex near the optical axis 600. The object-side surface 641 and the image-side surface 642 are aspheric.

The fifth lens 650 with positive refractive power is made of a plastic material and includes an object-side surface 651 and an image-side surface 652, wherein the object-side surface 651 of the fifth lens 650 is convex near the optical axis 600, and the image-side surface 652 of the fifth lens 650 is concave near the optical axis 600. The object-side surface 651 and the image-side surface 652 are aspheric.

The sixth lens 660 with positive refractive power is made of a plastic material and includes an object-side surface 661 and an image-side surface 662, wherein the object-side surface 661 of the sixth lens 660 is convex near the optical axis 600, and the image-side surface 662 of the sixth lens 660 is convex near the optical axis 600. The object-side surface 661 and the image-side surface 662 are aspheric.

The seventh lens 670 with negative refractive power is made of a plastic material and includes an object-side surface 671 and an image-side surface 672, wherein the object-side surface 671 of the seventh lens 670 is concave near an optical axis 600, and the image-side surface 672 of the seventh lens 670 is concave near the optical axis 600. The object-side surface 671 and the image-side surface 672 are aspheric.

The IR-cut filter 680 is made of glass, and is disposed between the seventh lens 670 and the image plane 690 without affecting a focal length of the optical lens assembly. It can be understood that, the IR-cut filter 680 may also be formed on the surface of the above-mentioned lens. The IR-cut filter 680 may also be made of other materials.

Refer to Table 11 and Table 12 below.

TABLE 11

Sixth embodiment
f (focal length) = 6.51 mm (millimeters), Fno (f-number) = 1.62, FOV (field of view 2ω) = 85.0 deg (degree).

| Surface # | | Radius of curvature (mm) | Central thickness/gap (mm) | Material | Refractive index (nd) | Abbe number (vd) | Focal length (mm) |
|---|---|---|---|---|---|---|---|
| 0 | Object | Infinity | Infinity | | | | |
| 1 | Stop | Infinity | −0.559 | | | | |
| 2 | First lens | 2.853 (ASP) | 0.965 | Plastic | 1.59 | 61.25 | 6.25 |
| 3 | | 10.947 (ASP) | 0.049 | | | | |
| 4 | Second lens | 8.139 (ASP) | 0.280 | Plastic | 1.64 | 23.97 | −18.23 |
| 5 | | 4.731 (ASP) | 0.613 | | | | |
| 6 | Third lens | 27.338 (ASP) | 0.300 | Plastic | 1.67 | 19.24 | −24.65 |
| 7 | | 10.323 (ASP) | 0.098 | | | | |
| 8 | Fourth lens | 16.211 (ASP) | 0.902 | Plastic | 1.55 | 55.99 | 17.91 |
| 9 | | −24.201 (ASP) | 0.564 | | | | |
| 10 | Fifth lens | 4.330 (ASP) | 0.480 | Plastic | 1.57 | 37.67 | 164.19 |
| 11 | | 4.354 (ASP) | 0.456 | | | | |
| 12 | Sixth lens | 9.560 (ASP) | 0.612 | Plastic | 1.55 | 55.99 | 7.38 |
| 13 | | −6.818 (ASP) | 0.723 | | | | |
| 14 | Seventh lens | −27.179 (ASP) | 0.716 | Plastic | 1.55 | 55.99 | −4.55 |
| 15 | | 2.759 (ASP) | 0.500 | | | | |
| 16 | IR-cut filter | Infinity | 0.210 | Glass | 1.52 | 64.20 | |
| 17 | | Infinity | 0.523 | | | | |
| 18 | Image Plane | Infinity | — | | | | |

Reference wavelength 555 nm

TABLE 12

Aspheric coefficient

| Surface # | 2 | 3 | 4 | 5 | 6 | 7 | 8 |
|---|---|---|---|---|---|---|---|
| K: | −6.0908E+00 | 6.1997E+00 | 1.5157E+01 | −1.4850E+00 | 9.9000E+01 | −4.4532E+01 | −5.3464E+01 |
| A2: | 0.0000E+00 | 0.0000E+00 | 0.0000E+00 | 0.0000E+00 | 0.0000E+00 | 0.0000E+00 | 0.0000E+00 |
| A4: | 3.3477E−02 | −1.7419E−02 | −2.7059E−02 | 6.6151E−03 | −2.2950E−02 | −2.1816E−02 | −1.1651E−02 |
| A6: | −9.7755E−03 | 7.0398E−03 | 2.9729E−02 | −1.9609E−02 | −1.1750E−02 | 8.7939E−03 | 1.0533E−02 |
| A8: | 4.2048E−03 | 1.8501E−02 | −2.2022E−02 | 4.7123E−02 | 2.3450E−02 | −1.6012E−02 | −1.5339E−02 |
| A10: | 5.6901E−04 | −3.1678E−02 | 1.4594E−02 | −5.5112E−02 | −3.3242E−02 | 1.5184E−02 | 1.3286E−02 |
| A12: | −2.3284E−03 | 2.2979E−02 | −1.0489E−02 | 3.7448E−02 | 2.7905E−02 | −1.0289E−02 | −8.6592E−03 |
| A14: | 1.4712E−03 | −9.2523E−03 | 6.0862E−03 | −1.5249E−02 | −1.4292E−02 | 4.8807E−03 | 3.9165E−03 |
| A16: | −4.4839E−04 | 2.1552E−03 | −2.1431E−03 | 3.6570E−03 | 4.4426E−03 | −1.4122E−03 | −1.0853E−03 |
| A18: | 6.9039E−05 | −2.7216E−04 | 3.9926E−04 | −4.7396E−04 | −7.6805E−04 | 2.2359E−04 | 1.6343E−04 |
| A20: | −4.3117E−06 | 1.4359E−05 | −3.0449E−05 | 2.6066E−05 | 5.7070E−05 | −1.4889E−05 | −1.0224E−05 |

| Surface # | 9 | 10 | 11 | 12 | 13 | 14 | 15 |
|---|---|---|---|---|---|---|---|
| K: | 7.7147E+01 | −4.9099E+00 | −2.2284E+00 | 3.8894E+00 | −6.8156E+01 | 1.8112E+01 | −8.5587E+00 |
| A2: | 0.0000E+00 | 0.0000E+00 | 0.0000E+00 | 0.0000E+00 | 0.0000E+00 | 0.0000E+00 | 0.0000E+00 |
| A4: | −2.3948E−02 | −3.4649E−02 | −3.7838E−02 | 4.1474E−03 | 2.9916E−03 | −4.7795E−02 | −2.4310E−02 |
| A6: | 1.1093E−02 | 1.1745E−02 | 8.1216E−03 | −9.5871E−03 | 1.7198E−03 | 9.9691E−03 | 5.0807E−03 |
| A8: | −1.0078E−02 | −7.7471E−03 | −4.3656E−03 | 4.3503E−03 | −9.2300E−04 | −1.1371E−03 | −7.7633E−04 |
| A10: | 6.5541E−03 | 3.8178E−03 | 1.8812E−03 | −1.6431E−03 | 2.1000E−04 | 9.6654E−05 | 8.2380E−05 |
| A12: | −2.9032E−03 | −1.3903E−03 | −5.7362E−04 | 3.9985E−04 | −3.1176E−05 | −6.8935E−06 | −6.2140E−06 |
| A14: | 8.0991E−04 | 3.2808E−04 | 1.1258E−04 | −5.8897E−05 | 3.0375E−06 | 3.8937E−07 | 3.1353E−07 |
| A16: | −1.3458E−04 | −4.7320E−05 | −1.2888E−05 | 5.0573E−06 | −1.8245E−07 | −1.5011E−08 | −9.6669E−09 |
| A18: | 1.1859E−05 | 3.8172E−06 | 7.7791E−07 | −2.3111E−07 | 6.0402E−09 | 3.3459E−10 | 1.6153E−10 |
| A20: | −4.0883E−07 | −1.3086E−07 | −1.9140E−08 | 4.3187E−09 | −8.3505E−11 | −3.2051E−12 | −1.1096E−12 |

In the sixth embodiment, an aspheric curve equation is expressed as that in the first embodiment. In addition, definitions of parameters in the following tables are the same as those in the first embodiment, and are not repeated herein.

Referring to Table 11 and Table 12, the following data may be calculated:

| Sixth embodiment | | | |
|---|---|---|---|
| HFOV*BFL | 52.40 | R11/R10 | 2.20 |
| R7*R8 | −392.33 | R8/R12 | 3.55 |
| T45/T67 | 0.78 | T12/T23 | 0.08 |
| T67*R11/CT6 | 11.29 | CT7*R14/R10 | 0.45 |

-continued

Sixth embodiment

| BFLM/SL | 0.14 | f6/f4 | 0.41 |
| R2/T12 | 223.40 | R5*R6/R9*R10 | 14.97 |
| f/(R6 + R10) | 0.44 | R7*R8/R9*R10 | −20.81 |

Seventh Embodiment

Figure 7A:
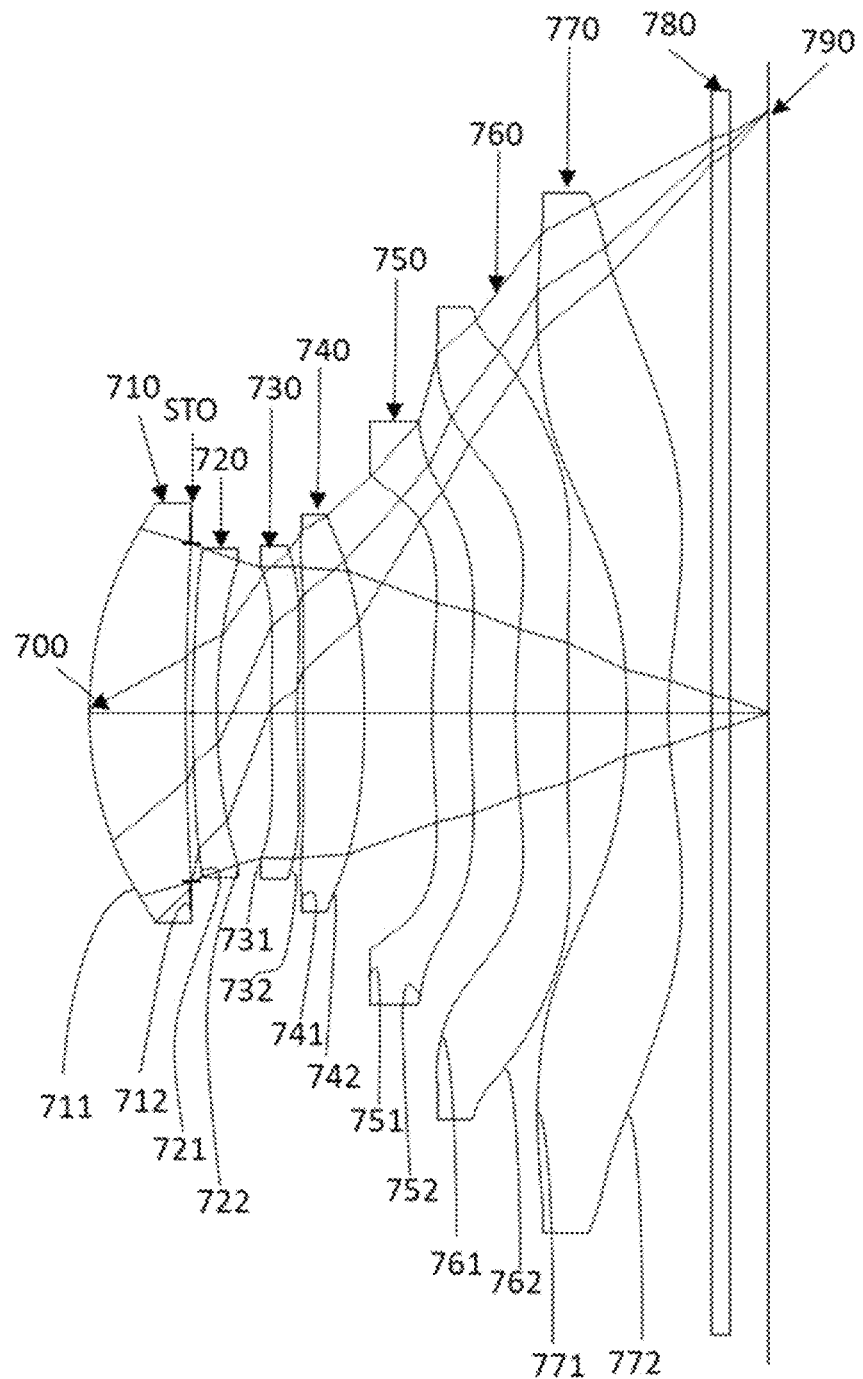
FIG. 7A is a schematic view of an optical lens assembly according to a seventh embodiment of the present disclosure.
Figure 7B:
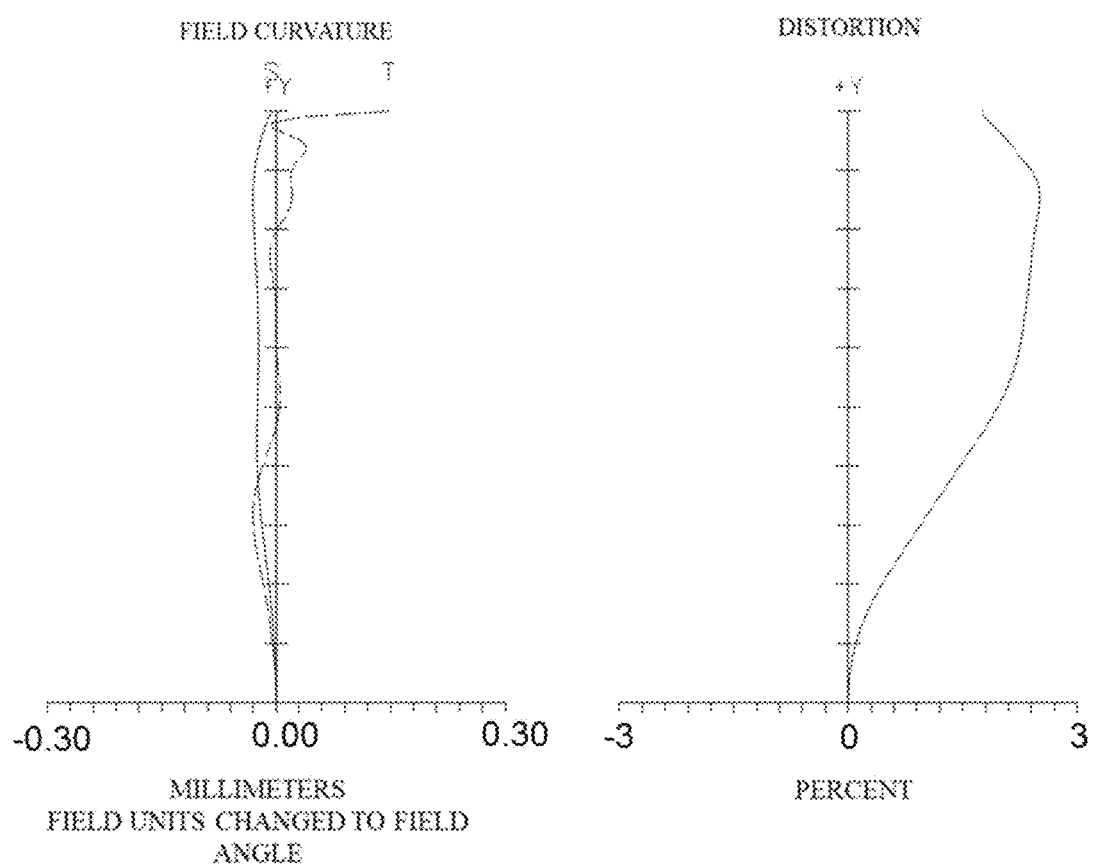
FIG. 7B shows a field curvature curves and a distortion curve of the optical lens assembly of the seventh embodiment.

Refer to FIG. 7A and FIG. 7B. FIG. 7A is a schematic view of an optical lens assembly according to a seventh embodiment of the present disclosure, and FIG. 7B shows a field curvature curve and a distortion curve of an optical lens assembly according to a second embodiment. As can be seen from FIG. 7A, the optical lens assembly includes a stop STO and includes, in order from an object side to an image side: a first lens 710, a second lens 720, a third lens 730, a fourth lens 740, a fifth lens 750, a sixth lens 760, a seventh lens 770, an IR-cut filter 780, and an image plane 790. A total quantity of lenses with refractive power in the optical lens assembly is seven, but not limited thereto.

The first lens 710 with positive refractive power is made of a plastic material and includes an object-side surface 711 and an image-side surface 712, wherein the object-side surface 711 of the first lens 710 is convex near an optical axis 700, and the image-side surface 712 of the first lens 710 is concave near the optical axis 700. The object-side surface 711 and the image-side surface 712 are aspheric.

The second lens 720 with negative refractive power is made of a plastic material and includes an object-side surface 721 and an image-side surface 722, wherein the object-side surface 721 of the second lens 720 is convex near the optical axis 700, and the image-side surface 722 of the second lens 720 is concave near the optical axis 700. The object-side surface 721 and the image-side surface 722 are aspheric.

The third lens 730 with negative refractive power is made of a plastic material and includes an object-side surface 731 and an image-side surface 732, wherein the object-side surface 731 of the third lens 730 is convex near an optical axis 700, and the image-side surface 732 of the third lens 730 is concave near the optical axis 700. The object-side surface 731 and the image-side surface 732 are aspheric.

The fourth lens 740 with positive refractive power is made of a plastic material and includes an object-side surface 741 and an image-side surface 742, wherein the object-side surface 741 of the fourth lens 740 is convex near an optical axis 700, and the image-side surface 742 of the fourth lens 740 is convex near the optical axis 700. The object-side surface 741 and the image-side surface 742 are aspheric.

The fifth lens 750 with positive refractive power is made of a plastic material and includes an object-side surface 751 and an image-side surface 752, wherein the object-side surface 751 of the fifth lens 750 is convex near the optical axis 700, and the image-side surface 752 of the fifth lens 750 is concave near the optical axis 700. The object-side surface 751 and the image-side surface 752 are aspheric.

The sixth lens 760 with positive refractive power is made of a plastic material and includes an object-side surface 761 and an image-side surface 762, wherein the object-side surface 761 of the sixth lens 760 is convex near the optical axis 700, and the image-side surface 762 of the sixth lens 760 is convex near the optical axis 700. The object-side surface 761 and the image-side surface 762 are aspheric.

The seventh lens 770 with negative refractive power is made of a plastic material and includes an object-side surface 771 and an image-side surface 772, wherein the object-side surface 771 of the seventh lens 770 is concave near an optical axis 700, and the image-side surface 772 of the seventh lens 770 is concave near the optical axis 700. The object-side surface 771 and the image-side surface 772 are aspheric.

The IR-cut filter 780 is made of glass, and is disposed between the seventh lens 770 and the image plane 790 without affecting a focal length of the optical lens assembly. It can be understood that, the IR-cut filter 780 may also be formed on the surface of the above-mentioned lens. The IR-cut filter 780 may also be made of other materials.

Refer to Table 13 and Table 14 below.

TABLE 13

Seventh embodiment
f (focal length) = 6.53 mm (millimeters), Fno (f-number) = 1.63, FOV (field of view 2ω) = 85.0 deg(degree).

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | First lens | 3.144 | (ASP) | 1.136 | Glass | 1.59 | 61.25 | 6.29 |
| 2 | | 17.626 | (ASP) | 0.072 | | | | |
| 3 | Stop | Infinity | | 0.011 | | | | |
| 4 | Second lens | 9.872 | (ASP) | 0.284 | Plastic | 1.64 | 23.97 | −15.17 |
| 5 | | 4.840 | (ASP) | 0.627 | | | | |
| 6 | Third lens | 15.961 | (ASP) | 0.304 | Plastic | 1.67 | 19.24 | −31.68 |
| 7 | | 9.083 | (ASP) | 0.071 | | | | |
| 8 | Fourth lens | 47.127 | (ASP) | 0.728 | Plastic | 1.55 | 55.99 | 12.48 |
| 9 | | −7.928 | (ASP) | 0.784 | | | | |
| 10 | Fifth lens | 6.063 | (ASP) | 0.461 | Plastic | 1.57 | 37.67 | 68.75 |
| 11 | | 6.960 | (ASP) | 0.518 | | | | |
| 12 | Sixth lens | 6.601 | (ASP) | 0.630 | Plastic | 1.55 | 55.99 | 9.26 |
| 13 | | −20.889 | (ASP) | 0.672 | | | | |
| 14 | Seventh lens | −7.169 | (ASP) | 0.501 | Plastic | 1.55 | 55.99 | −4.30 |
| 15 | | 3.578 | (ASP) | 0.500 | | | | |
| 16 | IR-cut filter | Infinity | | 0.210 | Glass | 1.52 | 64.20 | |
| 17 | | Infinity | | 0.482 | | | | |
| 18 | Image Plane | Infinity | | — | | | | |

Reference wavelength 555 nm

TABLE 14

Aspheric coefficient

| Surface # | 2 | 3 | 4 | 5 | 6 | 7 | 8 |
|---|---|---|---|---|---|---|---|
| K: | −8.6389E+00 | 2.8167E+01 | 4.3637E+00 | −5.6383E+00 | −6.7105E+01 | −9.0661E+01 | −9.3115E+01 |
| A2: | 0.0000E+00 | 0.0000E+00 | 0.0000E+00 | 0.0000E+00 | 0.0000E+00 | 0.0000E+00 | 0.0000E+00 |
| A4: | 3.4685E−02 | −2.0561E−02 | −3.7879E−02 | −4.3498E−03 | −3.5532E−02 | −2.8866E−02 | −1.6048E−02 |
| A6: | −1.3063E−02 | 1.3685E−02 | 3.6952E−02 | −1.4286E−02 | 2.8617E−03 | 8.7596E−03 | −6.5651E−03 |
| A8: | 7.6125E−03 | −3.9008E−03 | −2.6979E−02 | 6.1094E−02 | 7.3463E−03 | 6.1253E−03 | 5.1139E−02 |
| A10: | −4.2866E−03 | 2.3960E−04 | 2.0196E−02 | −9.2205E−02 | −2.4991E−02 | −2.1439E−02 | −7.3954E−02 |
| A12: | 1.8359E−03 | −2.5200E−04 | −1.3088E−02 | 8.1387E−02 | 2.7764E−02 | 1.6051E−02 | 5.2624E−02 |
| A14: | −5.3529E−04 | 3.6353E−04 | 5.9479E−03 | −4.4813E−02 | −1.6687E−02 | −5.1896E−03 | −2.1296E−02 |
| A16: | 9.9179E−05 | −1.5925E−04 | −1.6831E−03 | 1.5113E−02 | 5.8019E−03 | 6.1035E−04 | 5.0118E−03 |
| A18: | −1.0543E−05 | 3.0148E−05 | 2.6398E−04 | −2.8577E−03 | −1.0983E−03 | 4.4968E−05 | −6.4026E−04 |
| A20: | 4.8678E−07 | −2.1415E−06 | −1.7395E−05 | 2.3273E−04 | 8.8328E−05 | −1.2262E−05 | 3.4384E−05 |

| Surface # | 9 | 10 | 11 | 12 | 13 | 14 | 15 |
|---|---|---|---|---|---|---|---|
| K: | −4.9453E+01 | −1.0886E+01 | −9.6172E+00 | 4.1461E−01 | 2.6480E+00 | −1.0068E+01 | −1.4073E+01 |
| A2: | 0.0000E+00 | 0.0000E+00 | 0.0000E+00 | 0.0000E+00 | 0.0000E+00 | 0.0000E+00 | 0.0000E+00 |
| A4: | −3.6701E−02 | −3.7113E−02 | −4.4532E−02 | −9.9289E−03 | 2.9009E−02 | −3.2556E−02 | −2.0372E−02 |
| A6: | 2.2273E−02 | 1.9250E−02 | 1.4248E−02 | −1.9986E−03 | −7.8283E−03 | 7.5719E−03 | 3.6165E−03 |
| A8: | −2.4716E−02 | −1.6330E−02 | −7.2486E−03 | −1.1200E−03 | −7.5342E−05 | −1.1874E−03 | −5.0621E−04 |
| A10: | 2.1720E−02 | 9.8117E−03 | 3.0011E−03 | 4.7214E−04 | 3.5690E−04 | 1.5603E−04 | 4.2479E−05 |
| A12: | −1.2641E−02 | −4.0921E−03 | −8.9640E−04 | −9.0905E−05 | −7.9091E−05 | −1.4695E−05 | −1.7043E−06 |
| A14: | 4.6580E−03 | 1.0917E−03 | 1.7073E−04 | 1.1267E−05 | 8.8808E−06 | 8.8593E−07 | 2.7300E−09 |
| A16: | −1.0437E−03 | −1.7715E−04 | −1.8827E−05 | −8.5767E−07 | −5.6231E−07 | −3.2130E−08 | 2.3431E−09 |
| A18: | 1.2900E−04 | 1.5777E−05 | 1.0880E−06 | 3.5278E−08 | 1.8963E−08 | 6.3791E−10 | −7.8675E−11 |
| A20: | −6.6483E−06 | −5.8292E−07 | −2.5477E−08 | −5.9446E−10 | −2.6409E−10 | −5.3280E−12 | 8.3050E−13 |

In the Seventh embodiment, an aspheric curve equation is expressed as that in the first embodiment. In addition, definitions of parameters in the following tables are the same as those in the first embodiment, and are not repeated herein.

Referring to Table 13 and Table 14, the following data may be calculated:

| Seventh embodiment | | | |
|---|---|---|---|
| HFOV*BFL | 50.64 | R11/R10 | 0.95 |
| R7*R8 | −373.61 | R8/R12 | 0.38 |
| T45/T67 | 1.17 | T12/T23 | 0.13 |
| T67*R11/CT6 | 7.04 | CT7*R14/R10 | 0.26 |
| BFLM/SL | 0.15 | f6/f4 | 0.74 |
| R2/T12 | 212.36 | R5*R6/R9*R10 | 3.44 |
| f/(R6 + R10) | 0.41 | R7*R8/R9*R10 | −8.85 |

Eighth Embodiment

Figure 8A:
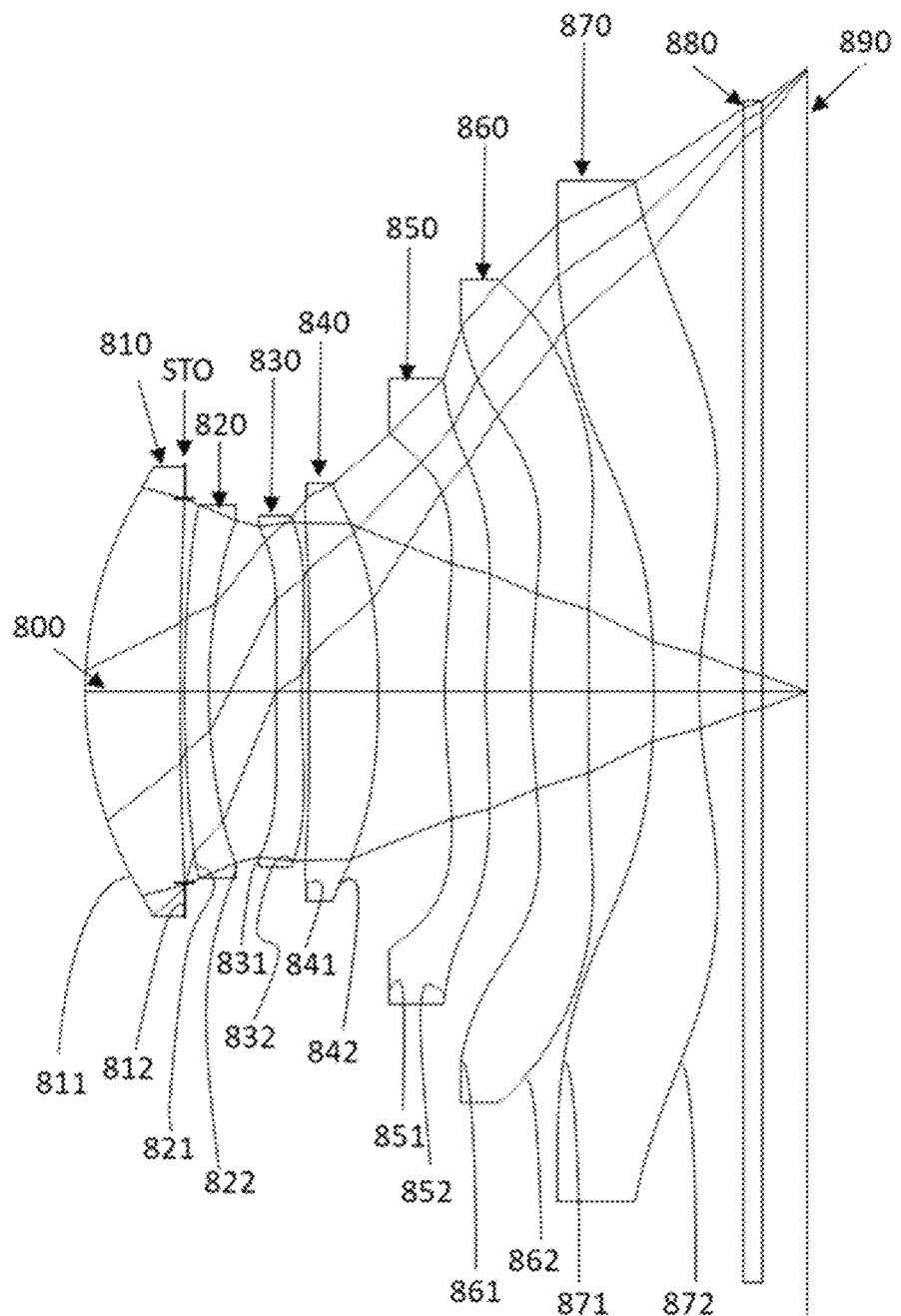
FIG. 8A is a schematic view of an optical lens assembly according to an eighth embodiment of the present disclosure.
Figure 8B:
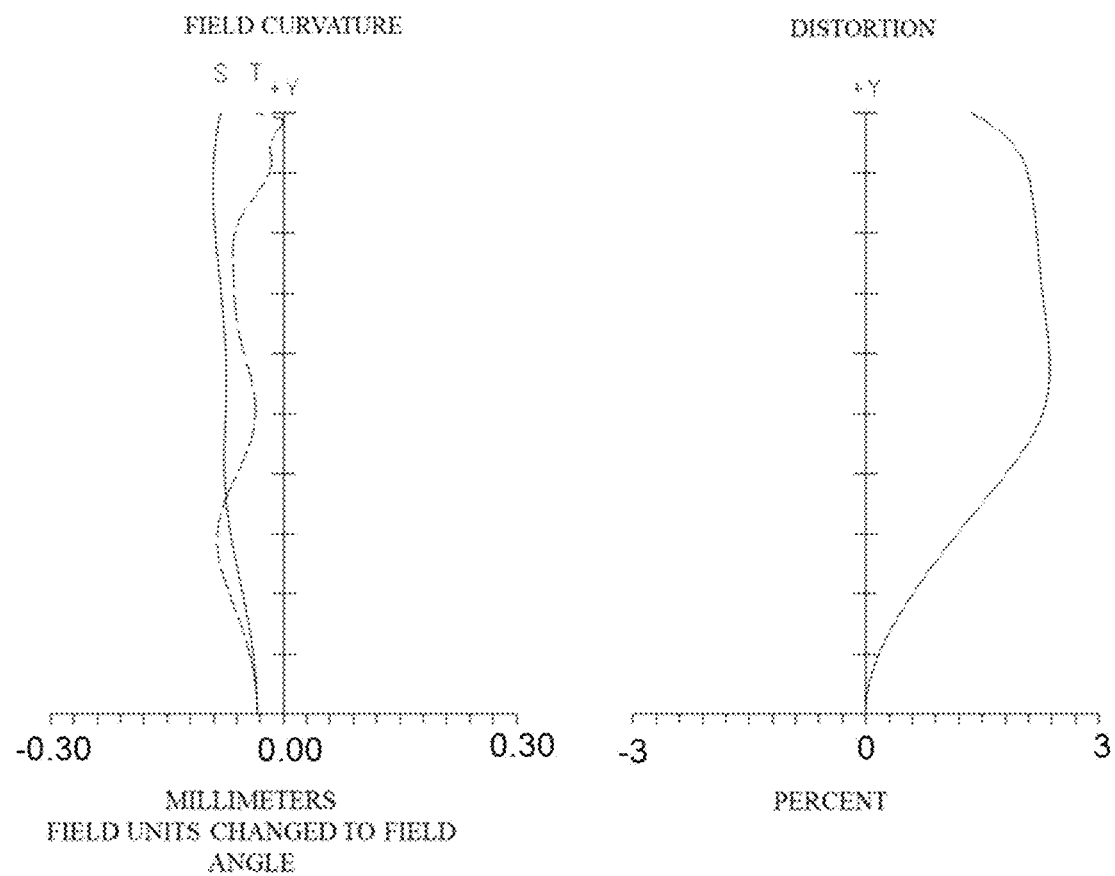
FIG. 8B shows a field curvature curves and a distortion curve of the optical lens assembly of the eighth embodiment.

Refer to FIG. 8A and FIG. 8B. FIG. 8A is a schematic view of an optical lens assembly according to a eighth embodiment of the present disclosure, and FIG. 8B shows a field curvature curve and a distortion curve of an optical lens assembly according to a second embodiment. As can be seen from FIG. 8A, the optical lens assembly includes a stop STO and includes, in order from an object side to an image side: a first lens 810, a second lens 820, a third lens 830, a fourth lens 840, a fifth lens 850, a sixth lens 860, a seventh lens 870, an IR-cut filter 880, and an image plane 890. A total quantity of lenses with refractive power in the optical lens assembly is seven, but not limited thereto.

The first lens 810 with positive refractive power is made of a plastic material and includes an object-side surface 811 and an image-side surface 812, wherein the object-side surface 811 of the first lens 810 is convex near an optical axis 800, and the image-side surface 812 of the first lens 810 is concave near the optical axis 800. The object-side surface 811 and the image-side surface 812 are aspheric.

The second lens 820 with negative refractive power is made of a plastic material and includes an object-side surface 821 and an image-side surface 822, wherein the object-side surface 821 of the second lens 820 is convex near the optical axis 800, and the image-side surface 822 of the second lens 820 is concave near the optical axis 800. The object-side surface 821 and the image-side surface 822 are aspheric.

The third lens 830 with negative refractive power is made of a plastic material and includes an object-side surface 831 and an image-side surface 832, wherein the object-side surface 831 of the third lens 830 is convex near an optical axis 800, and the image-side surface 832 of the third lens 830 is concave near the optical axis 800. The object-side surface 831 and the image-side surface 832 are aspheric.

The fourth lens 840 with positive refractive power is made of a plastic material and includes an object-side surface 841 and an image-side surface 842, wherein the object-side surface 841 of the fourth lens 840 is convex near an optical axis 800, and the image-side surface 842 of the fourth lens 840 is convex near the optical axis 800. The object-side surface 841 and the image-side surface 842 are aspheric.

The fifth lens 850 with positive refractive power is made of a plastic material and includes an object-side surface 851 and an image-side surface 852, wherein the object-side surface 851 of the fifth lens 850 is convex near the optical axis 800, and the image-side surface 852 of the fifth lens 850 is concave near the optical axis 800. The object-side surface 851 and the image-side surface 852 are aspheric.

The sixth lens 860 with positive refractive power is made of a plastic material and includes an object-side surface 861 and an image-side surface 862, wherein the object-side surface 861 of the sixth lens 860 is convex near the optical axis 800, and the image-side surface 862 of the sixth lens 860 is convex near the optical axis 800. The object-side surface 861 and the image-side surface 862 are aspheric.

The seventh lens 870 with negative refractive power is made of a plastic material and includes an object-side surface 871 and an image-side surface 872, wherein the object-side surface 871 of the seventh lens 870 is concave near an optical axis 800, and the image-side surface 872 of the seventh lens 870 is concave near the optical axis 800. The object-side surface 871 and the image-side surface 872 are aspheric.

The IR-cut filter 880 is made of glass, and is disposed between the seventh lens 870 and the image plane 890 without affecting a focal length of the optical lens assembly. It can be understood that, the IR-cut filter 880 may also be formed on the surface of the above-mentioned lens. The IR-cut filter 880 may also be made of other materials.

Refer to Table 15 and Table 16 below.

TABLE 15

Eighth embodiment
f (focal length) = 6.55 mm (millimeters), Fno (f-number) = 1.63, FOV (field of view 2ω) = 85.0 deg (degree).

| Surface # | | Radius of curvature (mm) | | Central thickness/gap (mm) | Material | Refractive index (nd) | Abbe number (vd) | Focal length (mm) |
|---|---|---|---|---|---|---|---|---|
| 0 | Object | Infinity | | Infinity | | | | |
| 1 | First lens | 3.356 | (ASP) | 1.070 | Glass | 1.59 | 61.25 | 6.58 |
| 2 | | 21.569 | (ASP) | 0.065 | | | | |
| 3 | Stop | Infinity | | −0.015 | | | | |
| 4 | Second lens | 8.015 | (ASP) | 0.280 | Plastic | 1.64 | 23.97 | −16.68 |
| 5 | | 4.516 | (ASP) | 0.756 | | | | |
| 6 | Third lens | 20.270 | (ASP) | 0.300 | Plastic | 1.67 | 19.24 | −27.79 |
| 7 | | 9.703 | (ASP) | 0.076 | | | | |
| 8 | Fourth lens | 64.740 | (ASP) | 0.789 | Plastic | 1.55 | 55.99 | 12.35 |
| 9 | | −7.500 | (ASP) | 0.757 | | | | |
| 10 | Fifth lens | 5.349 | (ASP) | 0.461 | Plastic | 1.57 | 37.43 | 50.96 |
| 11 | | 6.354 | (ASP) | 0.523 | | | | |
| 12 | Sixth lens | 6.616 | (ASP) | 0.662 | Plastic | 1.55 | 55.99 | 9.77 |
| 13 | | −26.614 | (ASP) | 0.730 | | | | |
| 14 | Seventh lens | −8.955 | (ASP) | 0.515 | Plastic | 1.55 | 55.99 | −4.57 |
| 15 | | 3.530 | (ASP) | 0.500 | | | | |
| 16 | IR-cut filter | Infinity | | 0.210 | Glass | 1.52 | 64.20 | |
| 17 | | Infinity | | 0.512 | | | | |
| 18 | Image Plane | Infinity | | — | | | | |

Reference wavelength 555 nm

TABLE 16

Aspheric coefficient

| Surface # | 2 | 3 | 4 | 5 | 6 | 7 | 8 |
|---|---|---|---|---|---|---|---|
| K: | −9.2775E+00 | 5.3666E+01 | 9.1537E−01 | −5.9453E+00 | −6.6312E+01 | −9.5359E+01 | −7.5752E+01 |
| A2: | 0.0000E+00 | 0.0000E+00 | 0.0000E+00 | 0.0000E+00 | 0.0000E+00 | 0.0000E+00 | 0.0000E+00 |
| A4: | 3.0241E−02 | −2.1426E−02 | −3.7663E−02 | −3.8819E−04 | −2.8782E−02 | −3.1647E−02 | −2.4752E−02 |
| A6: | −1.0773E−02 | 2.1522E−02 | 3.7496E−02 | −2.0575E−02 | 4.8674E−04 | 3.2482E−02 | 1.4771E−02 |
| A8: | 6.6921E−03 | −1.3417E−02 | −2.7490E−02 | 5.7464E−02 | 4.3854E−03 | −4.2935E−02 | 6.2700E−03 |
| A10: | −4.3406E−03 | 7.2545E−03 | 1.8775E−02 | −7.3715E−02 | −1.5716E−02 | 3.6910E−02 | −1.7926E−02 |
| A12: | 2.0940E−03 | −3.7351E−03 | −1.0974E−02 | 5.7447E−02 | 1.6541E−02 | −2.3890E−02 | 1.2875E−02 |
| A14: | −6.6038E−04 | 1.4968E−03 | 4.5955E−03 | −2.8486E−02 | −9.1131E−03 | 1.0773E−02 | −4.7690E−03 |
| A16: | 1.2814E−04 | −3.8847E−04 | −1.2194E−03 | 8.7871E−03 | 2.8179E−03 | −3.0631E−03 | 9.9198E−04 |
| A18: | −1.3947E−05 | 5.6166E−05 | 1.8158E−04 | −1.5378E−03 | −4.6053E−04 | 4.8904E−04 | −1.0883E−04 |
| A20: | 6.5029E−07 | −3.4036E−06 | −1.1451E−05 | 1.1708E−04 | 3.1218E−05 | −3.3333E−05 | 4.8418E−06 |

| Surface # | 9 | 10 | 11 | 12 | 13 | 14 | 15 |
|---|---|---|---|---|---|---|---|
| K: | −1.9966E+01 | −5.4721E+00 | −4.3523E+00 | 6.7867E−01 | −5.5760E+01 | −7.9749E+00 | −4.2741E+00 |
| A2: | 0.0000E+00 | 0.0000E+00 | 0.0000E+00 | 0.0000E+00 | 0.0000E+00 | 0.0000E+00 | 0.0000E+00 |
| A4: | −3.6909E−02 | −4.1636E−02 | −5.0295E−02 | −1.6555E−02 | 2.5511E−02 | −1.8343E−02 | −2.9214E−02 |
| A6: | 2.5103E−02 | 2.4477E−02 | 2.2418E−02 | 2.4914E−03 | −6.2499E−03 | 1.0168E−03 | 5.7746E−03 |
| A8: | −3.0640E−02 | −1.7521E−02 | −1.0803E−02 | −1.3964E−03 | 2.3384E−04 | 2.4836E−06 | −9.2596E−04 |
| A10: | 2.6286E−02 | 8.6846E−03 | 3.7614E−03 | 2.3311E−04 | 9.5822E−05 | −3.5938E−05 | 1.0163E−04 |
| A12: | −1.4452E−02 | −2.9493E−03 | −9.1620E−04 | −1.8031E−05 | −1.8500E−05 | 1.6083E−06 | −7.2899E−06 |
| A14: | 5.0186E−03 | 6.4930E−04 | 1.4714E−04 | 1.3281E−06 | 1.6412E−06 | 1.4058E−08 | 3.3732E−07 |
| A16: | −1.0610E−03 | −8.7949E−05 | −1.4354E−05 | −1.2568E−07 | −8.2045E−08 | −3.9266E−09 | −9.6998E−09 |
| A18: | 1.2391E−04 | 6.5969E−06 | 7.6134E−07 | 7.1738E−09 | 2.2156E−09 | 1.3746E−10 | 1.5751E−10 |
| A20: | −6.0568E−06 | −2.0688E−07 | −1.6787E−08 | −1.5342E−10 | −2.5024E−11 | −1.6188E−12 | −1.1030E−12 |

In the Eighth embodiment, an aspheric curve equation is expressed as that in the first embodiment. In addition, definitions of parameters in the following tables are the same as those in the first embodiment, and are not repeated herein.

Referring to Table 15 and Table 16, the following data may be calculated:

| Eighth embodiment | | | |
|---|---|---|---|
| HFOV*BFL | 51.91 | R11/R10 | 1.04 |
| R7*R8 | −485.52 | R8/R12 | 0.28 |
| T45/T67 | 1.04 | T12/T23 | 0.07 |
| T67*R11/CT6 | 7.30 | CT7*R14/R10 | 0.29 |
| BFLM/SL | 0.14 | f6/f4 | 0.79 |
| R2/T12 | 431.38 | R5*R6/R9*R10 | 5.79 |
| f/(R6 + R10) | 0.41 | R7*R8/R9*R10 | −14.29 |

Ninth Embodiment

Figure 9:
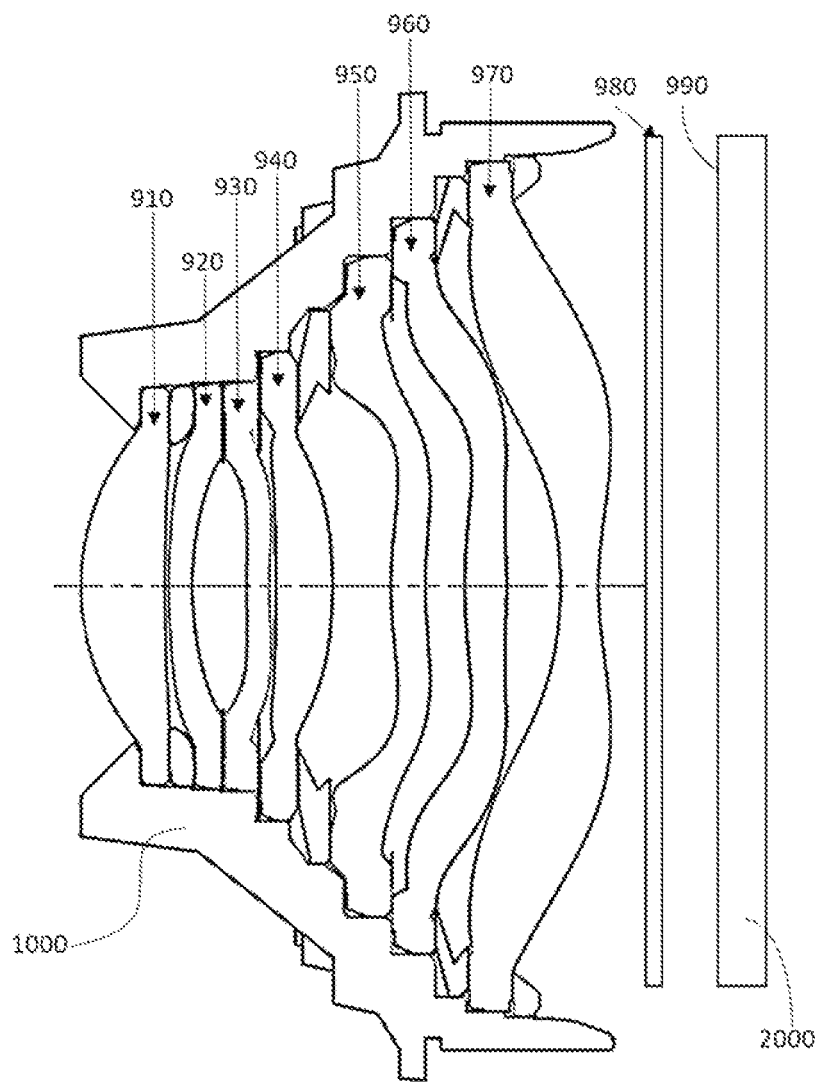
FIG. 9 is a schematic view of a photographing module according to a ninth embodiment of the present disclosure.

Refer to FIG. 9. FIG. 9 is a schematic view of a photographing module according to a ninth embodiment of the present disclosure. The photographing module includes a lens barrel 1000; an optical lens assembly disposed in the lens barrel 1000 and includes, in order from an object side to an image side: a first lens 910, a second lens 920, a third lens 930, a fourth lens 940, a fifth lens 950, a sixth lens 960, a seventh lens 970, and an IR-cut filter 980; and an image sensor 2000 being an electronic photosensitive element and disposed on an image plane 990 of the optical lens assembly. The optical lens assembly is the optical lens assembly according to the above fifth embodiment, but is not limited thereto, and may also be the same as the optical lens assembly of other embodiments.

In the foregoing embodiments, those with ordinary knowledge in the art should understand that, in the optical lens assembly and the photographing module provided in the present disclosure, the lens may be made of glass or plastic. The lens made of glass can increase the degree of freedom of the configuration of the refractive power of the optical lens assembly. The lens made of glass may be made by using related technologies such as grinding, molding, or the like. The lens made of plastic can reduce the production costs.

In the optical lens assembly provided in the present disclosure, for the lens with refractive power, if the surface of the lens is convex and a position of the convex surface is not defined, it indicates that the surface of the lens is convex near the optical axis. If the surface of the lens is concave and a position of the concave surface is not defined, it indicates that the surface of the lens is concave near the optical axis.

The optical lens assembly provided in the present disclosure is applicable to an optical system that requires a large aperture and a larger field of view according to requirements, and has the characteristics of the large field of view and desirable image quality. The optical lens assembly is applicable to electronic imaging systems such as a mobile phone, a notebook computer, a digital drawing board, a mobile device, a digital camera, or vehicle photography in many aspects.

What is claimed is:

1. An optical lens assembly, comprising a stop and, in order from an object side to an image side, comprising:
    a first lens with positive refractive power, comprising an object-side surface and an image-side surface;
    a second lens with negative refractive power, comprising an object-side surface and an image-side surface, one of the object-side surface and the image-side surface of the second lens being aspheric;
    a third lens with negative refractive power, comprising an object-side surface and an image-side surface, one of the object-side surface and the image-side surface of the third lens being aspheric;
    a fourth lens with positive refractive power, comprising an object-side surface and an image-side surface, one of the object-side surface and the image-side surface of the fourth lens being aspheric;
    a fifth lens with positive refractive power, comprising an object-side surface and an image-side surface, one of the object-side surface and the image-side surface of the fifth lens being aspheric;
    a sixth lens with positive refractive power, comprising an object-side surface and an image-side surface, one of the object-side surface and the image-side surface of the sixth lens being aspheric; and
    a seventh lens with negative refractive power, comprising an object-side surface and an image-side surface, one of the object-side surface and the image-side surface of the seventh lens being aspheric;
    wherein a half of a maximum field of view of the optical lens assembly is HFOV, a distance from the image-side surface of the seventh lens to an image plane on an optical axis is BFL, a radius of curvature of the object-side surface of the fourth lens is R7, a radius of curvature of the image-side surface of the fourth lens is R8, and the following conditions are satisfied: 45<HFOV*BFL, and −1032.81<R7*R8<−298.89.

2. The optical lens assembly according to claim 1, wherein a distance from the image-side surface of the fourth lens to the object-side surface of the fifth lens along the optical axis is T45, a distance from the image-side surface of the sixth lens to the object-side surface of the seventh lens along the optical axis is T67, and the following condition is satisfied: 0.41<T45/T67<1.4.

3. The optical lens assembly according to claim 1, wherein a distance from the image-side surface of the sixth lens to the object-side surface of the seventh lens along the optical axis is T67, a radius of curvature of the object-side surface of the sixth lens is R11, a central thickness of the sixth lens along the optical axis is CT6, and the following condition is satisfied: 5.03<T67*R11/CT6<13.55.

4. The optical lens assembly according to claim 1, wherein a shortest distance from the image-side surface of the seventh lens to the image plane is BFLM, a distance from the stop to the image plane along the optical axis is SL, and the following condition is satisfied: 0<BFLM/SL<0.18.

5. The optical lens assembly according to claim 1, wherein a radius of curvature of the image-side surface of the first lens is R2, a distance from the image-side surface of the first lens to the object-side surface of the second lens along the optical axis is T12, and the following condition is satisfied: 169.89<R2/T12<517.65.

6. The optical lens assembly according to claim 1, wherein a focal length of the optical lens assembly is f, a radius of curvature of the image-side surface of the third lens is R6, a radius of curvature of the image-side surface of the fifth lens is R10, and the following condition is satisfied: 0.24<f/(R6+R10)<0.53.

7. The optical lens assembly according to claim 1, wherein a radius of curvature of the object-side surface of the sixth lens is R11, a radius of curvature of the image-side surface of the fifth lens is R10, and the following condition is satisfied: 0.76<R11/R10<2.63.

8. The optical lens assembly according to claim 1, wherein the radius of curvature of the image-side surface of the fourth lens is R8, a radius of curvature of the image-side surface of the sixth lens is R12, and the following condition is satisfied: 0.23<R8/R12<7.11.

9. The optical lens assembly according to claim 1, wherein a distance from the image-side surface of the first lens to the object-side surface of the second lens along the optical axis is T12, a distance from the image-side surface of the second lens to the object-side surface of the third lens along the optical axis is T23, and the following condition is satisfied: 0.05<T12/T23<0.16.

10. The optical lens assembly according to claim 1, wherein a central thickness of the seventh lens along the optical axis is CT7, a radius of curvature of the image-side surface of the seventh lens is R14, a radius of curvature of the image-side surface of the fifth lens is R10, and the following condition is satisfied: 0.21<CT7*R14/R10<0.55.

11. The optical lens assembly according to claim 1, wherein a focal length of the fourth lens is f4, a focal length of the sixth lens is f6, and the following condition is satisfied: 0.15<f6/f4<0.95.

12. The optical lens assembly according to claim 1, wherein a radius of curvature of the object-side surface of the third lens is R5, a radius of curvature of the image-side surface of the third lens is R6, a radius of curvature of the object-side surface of the fifth lens is R9, a radius of curvature of the image-side surface of the fifth lens is R10, and the following condition is satisfied: 2.75<R5*R6/R9*R10<60.45.

13. The optical lens assembly according to claim 1, wherein the radius of curvature of the object-side surface of the fourth lens is R7, the radius of curvature of the image-side surface of the fourth lens is R8, a radius of curvature of the object-side surface of the fifth lens is R9, a radius of curvature of the image-side surface of the fifth lens is R10, and the following condition is satisfied: −66.07<R7*R8/R9*R10<−7.08.

14. A photographing module, comprising:
a lens barrel;
an optical lens assembly disposed in the lens barrel; and
an image sensor disposed on an image plane of the optical lens assembly,
wherein the optical lens assembly, comprising a stop and, in order from an object side to an image side, comprising:
a first lens with positive refractive power, comprising an object-side surface and an image-side surface;
a second lens with negative refractive power, comprising an object-side surface and an image-side surface, one of the object-side surface and the image-side surface of the second lens being aspheric;
a third lens with negative refractive power, comprising an object-side surface and an image-side surface, one of the object-side surface and the image-side surface of the third lens being aspheric;
a fourth lens with positive refractive power, comprising an object-side surface and an image-side surface, one of the object-side surface and the image-side surface of the fourth lens being aspheric;
a fifth lens with positive refractive power, comprising an object-side surface and an image-side surface, one of the object-side surface and the image-side surface of the fifth lens being aspheric;
a sixth lens with positive refractive power, comprising an object-side surface and an image-side surface, one of the object-side surface and the image-side surface of the sixth lens being aspheric; and
a seventh lens with negative refractive power, comprising an object-side surface and an image-side surface, one of the object-side surface and the image-side surface of the seventh lens being aspheric;
wherein a half of a maximum field of view of the optical lens assembly is HFOV, a distance from the image-side surface of the seventh lens to an image plane on an optical axis is BFL, a radius of curvature of the object-side surface of the fourth lens is R7, a radius of curvature of the image-side surface of the fourth lens is R8, and the following conditions are satisfied: 45<HFOV*BFL, and −1032.81<R7*R8<−298.89.

15. The photographing module according to claim 14, wherein a distance from the image-side surface of the sixth lens to the object-side surface of the seventh lens along the optical axis is T67, a radius of curvature of the object-side surface of the sixth lens is R11, a central thickness of the sixth lens along the optical axis is CT6, and the following condition is satisfied: 5.03<T67*R11/CT6<13.55.

16. The photographing module according to claim 14, wherein a radius of curvature of the image-side surface of the first lens is R2, a distance from the image-side surface of the first lens to the object-side surface of the second lens along the optical axis is T12, and the following condition is satisfied: 169.89<R2/T12<517.65.

17. The photographing module according to claim 14, wherein a radius of curvature of the object-side surface of the sixth lens is R11, a radius of curvature of the image-side surface of the fifth lens is R10, and the following condition is satisfied: 0.76<R11/R10<2.63.

18. The photographing module according to claim 14, wherein a distance from the image-side surface of the first lens to the object-side surface of the second lens along the optical axis is T12, a distance from the image-side surface of the second lens to the object-side surface of the third lens along the optical axis is T23, and the following condition is satisfied: 0.05<T12/T23<0.16.

19. The photographing module according to claim 14, wherein a central thickness of the seventh lens along the optical axis is CT7, a radius of curvature of the image-side surface of the seventh lens is R14, a radius of curvature of the image-side surface of the fifth lens is R10, and the following condition is satisfied: 0.21<CT7*R14/R10<0.55.

20. The photographing module according to claim 14, wherein a radius of curvature of the object-side surface of the third lens is R5, a radius of curvature of the image-side surface of the third lens is R6, a radius of curvature of the object-side surface of the fifth lens is R9, a radius of curvature of the image-side surface of the fifth lens is R10, and the following condition is satisfied: 2.75<R5*R6/R9*R10<60.45.

* * * * *